(12) United States Patent
Johnsen et al.

(10) Patent No.: US 7,766,692 B2
(45) Date of Patent: Aug. 3, 2010

(54) CABLE INTERCONNECT SYSTEMS WITH CABLE CONNECTORS IMPLEMENTING STORAGE DEVICES

(75) Inventors: Bjorn Dag Johnsen, Oslo (NO); Ola Torudbakken, Oslo (NO); Inge Lars Birkeli, Lunner (NO); Andreas Bechtolsheim, Menlo Park, CA (US)

(73) Assignee: Oracle America, Inc., Redwood Shores, CA (US)

( * ) Notice: Subject to any disclaimer, the term of this patent is extended or adjusted under 35 U.S.C. 154(b) by 0 days.

(21) Appl. No.: 12/022,678

(22) Filed: Jan. 30, 2008

(65) Prior Publication Data

US 2008/0318465 A1    Dec. 25, 2008

Related U.S. Application Data

(60) Provisional application No. 60/945,778, filed on Jun. 22, 2007.

(51) Int. Cl.
*H01R 3/00*    (2006.01)

(52) U.S. Cl. ..................................... 439/488

(58) Field of Classification Search ............... 439/488, 439/489, 490; 323/283; 307/31; 385/147, 385/135
See application file for complete search history.

(56) References Cited

U.S. PATENT DOCUMENTS

| | | | | |
|---|---|---|---|---|
| 4,837,488 A * | 6/1989 | Donahue | ...................... | 324/66 |
| 5,570,002 A * | 10/1996 | Castleman | .................. | 323/283 |
| 5,602,989 A * | 2/1997 | Aria | ........................... | 714/43 |
| 6,002,331 A * | 12/1999 | Laor | ........................ | 340/539.1 |
| 6,590,659 B2 * | 7/2003 | Melnyk et al. | .............. | 356/406 |
| 7,027,704 B2 * | 4/2006 | Frohlich et al. | ............. | 385/135 |
| 7,468,669 B1 * | 12/2008 | Beck et al. | ................ | 340/572.1 |
| 2003/0021580 A1 * | 1/2003 | Matthews | ................... | 385/147 |
| 2006/0277324 A1 * | 12/2006 | Aldereguia et al. | ............ | 710/1 |
| 2007/0213958 A1 * | 9/2007 | Friedl et al. | ................. | 702/189 |

\* cited by examiner

*Primary Examiner*—Chandrika Prasad
(74) *Attorney, Agent, or Firm*—Park, Vaughan & Fleming LLP

(57) ABSTRACT

In order to monitor connectivity status associated with an interconnect cable from the end-points to which either end of the cable is attached, a storage device storing a field replaceable unit identifier is provided to uniquely identify a cable end-point, which identifier can then be accessed to determine the connectivity status.

19 Claims, 27 Drawing Sheets

FIG. 1

CABLE INTERCONNECT SYSTEMS WITH CABLE CONNECTORS IMPLEMENTING STORAGE DEVICES

RELATED APPLICATIONS

This application hereby claims priority under 35 U.S.C. §119 to U.S. Provisional Patent Application No. 60/945,778, filed on 22 Jun. 2007, entitled "CABLE INTERCONNECT SYSTEMS", by inventor(s) Bjorn Johnsen et al. The present application hereby incorporates by reference the above-referenced provisional patent application.

BACKGROUND

The invention relates to connectors for cables, to cables including such connectors and to systems having cable interconnects.

In a system having cable interconnects, the identification of local and remote cable connectivity is important for configuration and diagnosis of the cable-based interconnect system. This can include the determination of whether a cable is connected locally, whether it is connected at the remote end or ends (remote end for a single cable or remote ends for a split- or multi-link cable) and where the remote end(s) is (are) connected.

For example, with standard InfiniBand cables, the above issues can only be resolved if the link is able to train, and thereby to allow in-band packet traffic between the associated end-points. Hence, if the link is not able to train, then all the states associated with all the above aspects are in principle un-defined.

In order to address this, various techniques for local cable/connector presence detection, cable connectors with electrically readable FRUID information (i.e., serial-number etc.), combined with side-band and/or out-of-band communication can be implemented. However, even if these techniques are applied, it is still an issue that establishing the relevant state and connectivity information requires an active, "intelligent" entity (e.g., some kind of basic service processor with relevant firmware) associated with all the end points to which the cable is connected. Hence, inherently, this also implies that the end-points must be operating in at least a minimal power mode.

In some cases, it may not be possible to include an intelligent entity in the end-point design (e.g., a line-card implementation with no "side-band" access from any chassis/system service processor to the cable-connectors on the line-card, or an un-intelligent repeater module used to connect two individual cables together). In such cases, none of the desired information would be available until the link(s) associated with the cable connectors had been made operational and/or it might not be possible to determine the complete physical connectivity information.

Accordingly, the invention has been made, at least in part, in consideration of problems and drawbacks of conventional systems.

SUMMARY

An embodiment of the invention can provide cable connector for attaching cable, the cable connector comprising a storage device operable to store an identifier that identifies a cable end-point. An embodiment of the invention can also provide a cable comprising such a connector at a first end thereof. An embodiment of the invention can also provide a computer system 490 (see FIG. 36) comprising a plurality of system components 492 that have component connectors, and at least one such cable 406 that interconnects system components. The identifier can be a field replaceable unit (FRU) identifier (FRU-ID) that can uniquely identify the cable end point.

In an embodiment of the invention, in order to monitor connectivity status associated with an interconnect cable from the end-points to which either end of the cable is attached, a field replaceable unit identifier that uniquely identifies a cable end-point and is stored in such a storage device can be accessed to determine the connectivity status.

Although various aspects of the invention are set out in the accompanying independent and dependent claims, other aspects of the invention include any combination of features from the described embodiments and/or the accompanying dependent claims, possibly with the features of the independent claims, and not solely the combinations explicitly set out in the accompanying claims.

BRIEF DESCRIPTION OF THE DRAWINGS

Specific embodiments are described by way of example only with reference to the accompanying Figures in which:

FIG. 1 is a schematic representation of the rear of an example switch chassis;

Figure 2:
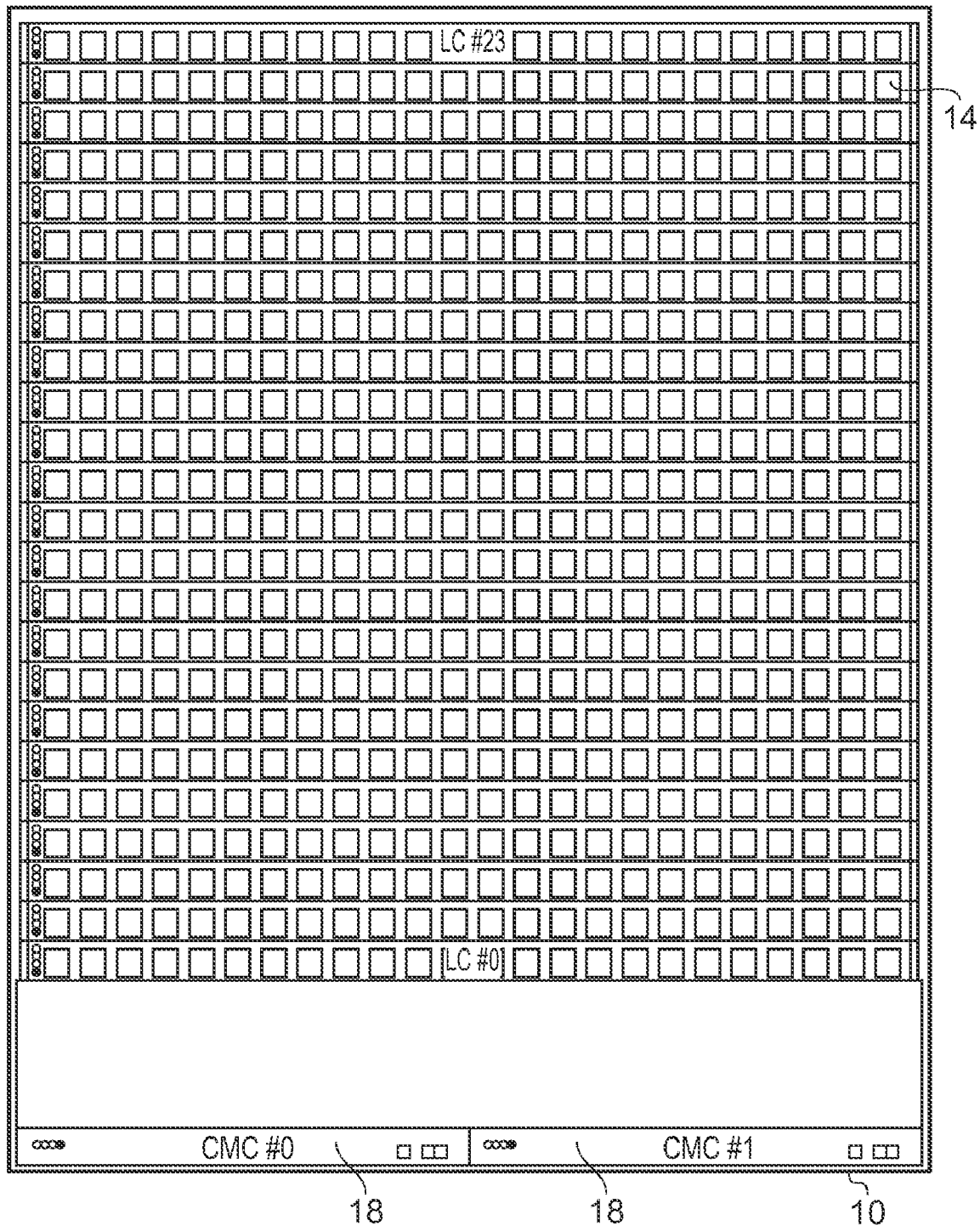
FIG. 2 is a schematic representation of the front of the example switch chassis.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention.

DETAILED DESCRIPTION

An example embodiment of a 3456-port InfiniBand 4×DDR switch in a custom rack chassis is described, with the switch architecture being based upon a 5-stage CLOS fabric. The rack chassis can form a switch enclosure.

The CLOS network, first described by Charles Clos in 1954, is a multi-stage fabric built from smaller individual switch elements that provides full-bisectional bandwidth for all end points, assuming effective dispersive routing.

Given that an external connection (copper or fiber) costs several times more per port than the silicon cost, the key to make large CLOS networks practical is to minimize the number of external cables required and to maximize the number of internal interconnections. This reduces the cost and increases the reliability. For example, a 5-stage fabric constructed with switching elements of size (n) ports supports (n*n/2*n/2) edge points, using (5*n/2*n/2) switch elements with a total of (3*n*n/2*n/2) connections. The ratio of total to external connections is 5:1, i.e. 80% of all connections can be kept internal. The switch elements (switch chips) in the described example can be implemented using a device with 24 4×DDR ports.

An example switch uses a connector that support 3 4× ports per connector, which can further to minimize a number of cables needed. This can provides a further 3:1 reduction in the number of cables. In a described example, only 1152 cables (1/3*n*n/2*n/2) are required.

In contrast if prior commercially available 288-port switches and 24-port switches were used to create a 3456-port fabric a total of 6912 cables (2*n*n/2*n/2) would be required.

The example switch can provide a single chassis that can implement a 5-stage CLOS fabric with 3456 4×DDR ports. High density external interfaces can be provided, including fiber, shielded copper, fiber and twisted pair copper. The amount of cabling can be reduced by 84.4% when compared to building a 3456-port fabric with commercially available 24-port and 288-port switches. In the present example, an orthogonal midplane design can be provided that is capable of DDR data rates.

An example switch can address a full range of HPC cluster computing from a few hundred to many thousand of nodes with a reliable and cost-effective solution that uses fewer chassis and cables than prior solutions.

Figure 1:
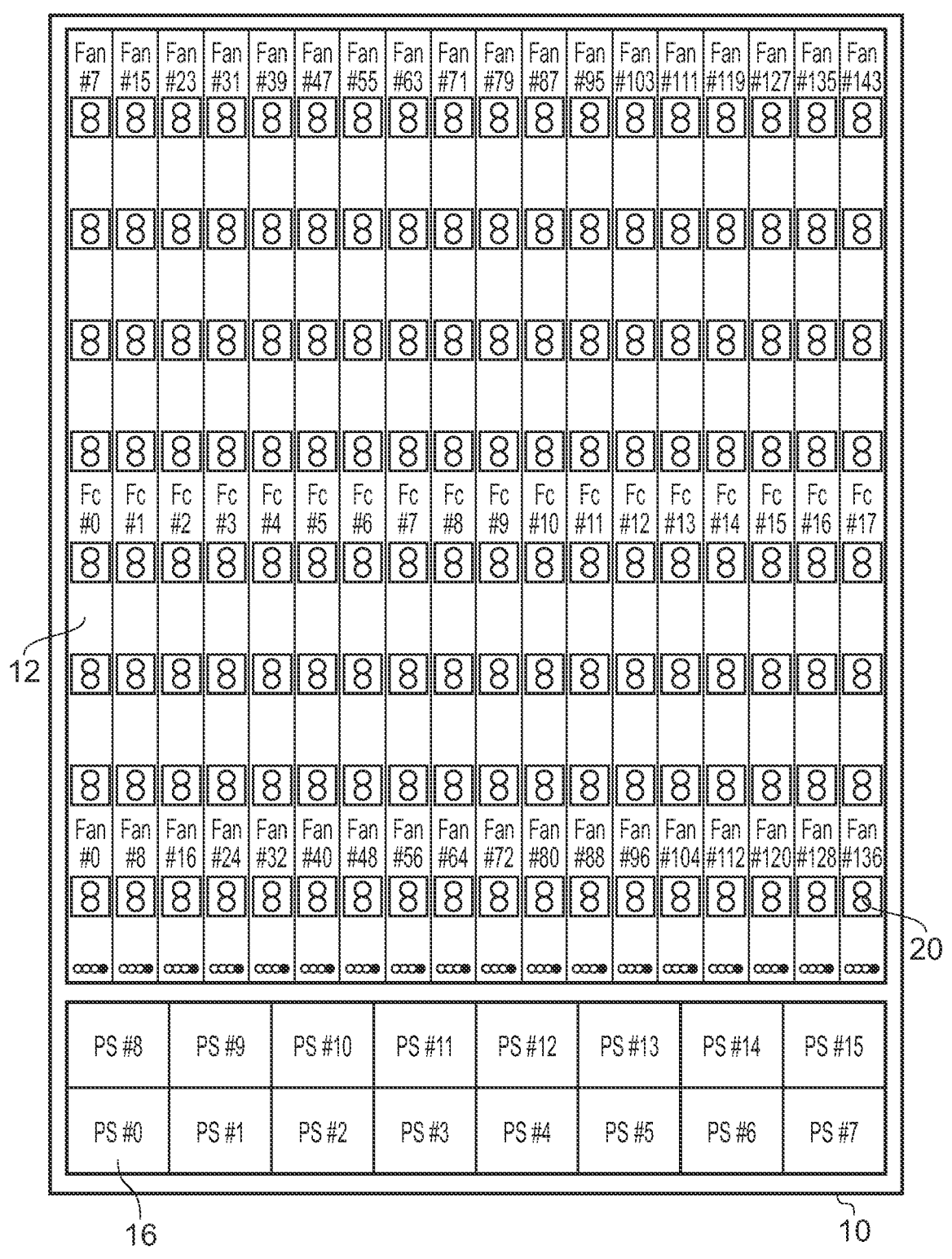

FIGS. 1 and 2 are schematic diagrams of an example of a switch chassis as viewed from the rear (FIG. 1) and front (FIG. 2), respectively. This example comprises a custom rack chassis 10 that is 60" high, 47" wide, and 36" deep, not including a cable management system. The present example provides a passive orthogonal midplane design (not shown in FIGS. 1 and 2) that provides a direct interface between Line Cards (LC) 12 and Fabric Cards (FC) 14. The line cards provide connections to external lines and the fabric card form switch fabric cards for providing switching functions.

In the present example, up to 18 fabric cards (FC0 to FC17) 12, FIG. 1 are provided. Each fabric card 12 plugs vertically into the midplane from the rear.

In the present example, up to 24 line cards (LC0 to LC23) 14, FIG. 2 can be provided. Each line card provides 144 4× ports (24 stacked 168-circuit cable connectors). Each line card plugs horizontally into the midplane from the front.

Up to 16 hot-pluggable power supply units (PS0-PS16) 16, FIG. 1 are each plugged into the chassis 10 from the rear. Each power supply unit 16 has an alternating current (AC) power supply inlet (not shown). The power supply units 16 plug into a power distribution board (PDB), which is not shown in FIGS. 1 and 2. Two busbars (not shown in FIGS. 1 and 2), one per group of 8 power supply units, distribute direct current (DC) supply to the line cards 12 and the fabric cards 14.

Two hot-pluggable Chassis Management Controllers (CMCs) 18, FIG. 2 plug into the power distribution board from the front. Each chassis management controller 18 comprises a mezzanine card.

The power distribution board is a passive power distribution board that supports up to 16 power supply units DC connectors and 2 chassis management controller slot connectors. The power distribution board connects to the midplane through ribbon cables that carry low-speed signals.

In the present example, up to 144 fan modules (Fan#0-Fan#143) 20 are provided, with 8 fan modules per fabric card 12 in the present instance. Cooling airflow in controlled to be from the front to the rear, using redundant fans on the fabric cards to pull the air from the line cards 14 through openings (not shown in FIGS. 1 and 2), in the midplane. The power supply units 16 have their own fans for cooling with the air exiting through the rear of the chassis. The power supply units 18 are also used to cool the chassis management controllers 18.

Figure 3:
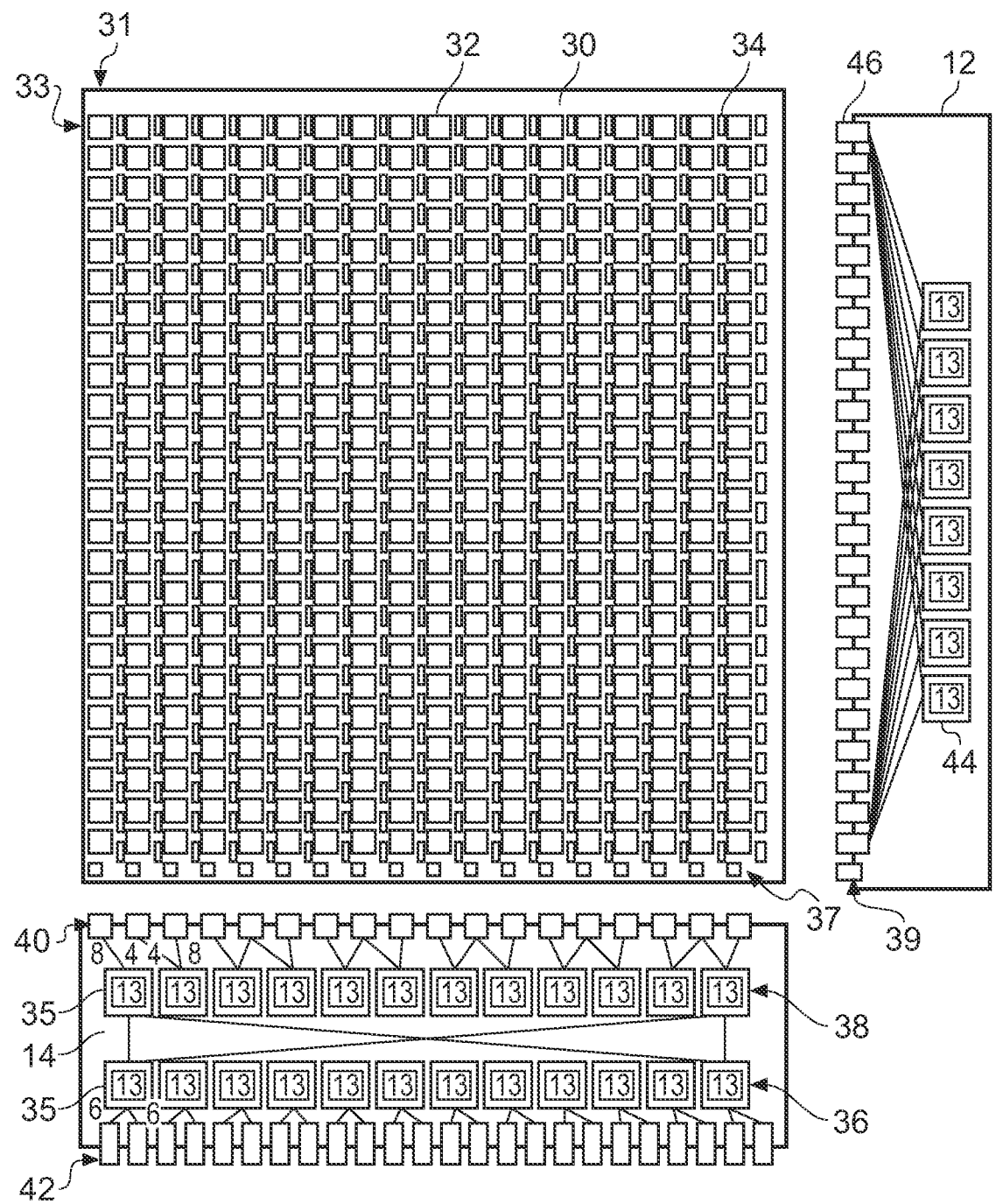
FIG. 3 is a schematic representation of a midplane illustrating the logical connectivity through the midplane between cards at the rear and cards at the front orientated orthogonally with respect to each other.

FIG. 3 is a schematic representation of a printed circuit board 30, which is configured as a midplane 30 in the switch chassis 10. The midplane 30 is configured in an orthogonal manner such that each fabric card 12 can connect to each of the line cards 14 without requiring any signal traces on the midplane 30. The orthogonal midplane design can provide excellent signal integrity in excess of 10 Gbps per differential pair.

The midplane 30 is represented schematically to show an array of midplane connector pairs 32 as black squares with ventilation openings shown as white rectangles. Each midplane connector pair 32 comprises a pair of connectors (to be explained in more detail later) with one connector on a first face of the midplane and a second connector on the other face of the midplane, the first and second connectors being electrically interconnected by way of pass-through vias (not shown in FIG. 3) formed in the midplane 30. As will be explained later, the first and second connectors of a midplane connector pair 32 are each multipath connectors. They are arranged orthogonally with respect to one another such that a first midplane connector of a midplane connector pair 32 is connectable to a fabric card 12 on a first side of the plane 30 in a first orientation and a second midplane connector of the midplane connector pair 32 is connectable to a line card on a second side of the plane 30 in a second orientation substantially orthogonally to the first orientation.

In an example described herein, each of the first connectors of the respective midplane connector pairs 32 of a column 31 of midplane connector pairs 32 can be connected to one fabric card 12. This can be repeated column by column for successive fabric cards 12. In an example described herein, each of the second connectors of the respective midplane connector pairs 32 of a row 33 of midplane connector pairs 32 can be connected to one line card 14. This can be repeated row by row for successive line cards 14. As a result, the midplane can be populated by vertically oriented fabric cards 12 on the first side of the midplane and horizontally orientated line cards 12 on the second side of the midplane 30.

In the present example the midplane 30 provides orthogonal connectivity between fabric cards 12 and the line cards 14 using orthogonal connector pairs. Each orthogonal connector pair provides 64 differential signal pairs, which is sufficient to carry the high-speed signals needed as well as a number of low-speed signals. The orthogonal connector pairs are not shown in FIG. 3, but are described later.

The midplane 30 is also configured to provide 3.3 VDC standby power distribution to all cards and to provide I2C/System Management Bus connections for all fabric cards 12 and line cards 14.

Another function of the midplane 30 is to provide thermal openings for a front-to-rear airflow. The white holes in FIG. 3 (e.g., hole 34) form openings 34 in the midplane for airflow. In this example the midplane is approximately 50% open for airflow.

The fabric cards 12 each support 24 connectors and the line cards 14 each support 18 connectors.

FIG. 3 also illustrates an example of how the fabric cards 12, the midplane 20 and the line cards 14 interconnect. In this example there are 24 switch chips on a line card 14 and 8 chips on each of the 18 fabric cards 12.

As previously mentioned a 5-stage Clos fabric has a size n*n/2*n/2 in which n is the size of the switch element. The example switch element in FIG. 3 has n equal to 24 ports. Each line card 14 has 24 chips in 2 rows with 12 chips in each row. Each of 12 ports of each switch chip 35 in a first row 36 of the line card 14 is connected to 2 cable connectors 42, with 6 ports per cable connector. There are a total of 24 cable connectors per line card 14. Each cable connector can accommodate two physical independent cables that each carries 3 ports (links). Each cable connector 42 can accommodate 6 ports. The remaining 12 ports of each switch chip 35 in the first row 26 is connected to one chip 35 each in a second row 38 of chips 35.

There are 18 midplane connectors 32 per line card 14. Each midplane connector 32 provides one physical connection to one fabric card 14. Each midplane connector 32 can accommodate 8 4x links (there are 8 differential pairs per 4x link and a total of 64 differential pairs provided by the orthogonal connector)

12 ports of each of the switch chips 35 in the second row 38 of the line card 14 are connected to 2 line card connectors 40 that are used to connect the line card 14 to the midplane connectors 32 and thereby with the fabric cards 12 through the orthogonally oriented midplane connector pair. Of the 12 ports per switch chip 35, eight ports are connected to one line card connector 40, and the remaining four ports are connected to another line card connector 40 as represented by the numbers 8 and 4 adjacent the two left hand switch chips 35 in the second row 38. 2 switch chips are thereby connected to a group of 3 line card connectors 40 and hence to a group of three midplane connectors pairs 32.

The remaining 12 ports of each switch chip 35 in the second row 38 of the line card 14 are connected to each of the 12 switch chips 35 in the first row 36 of the line card 14.

At the fabric card 12 all links through an orthogonally oriented midplane connector pair 32 are connected to one line card 14. A single orthogonal connector 46 carries 8 links. These links are connected to one switch element 44 each at the fabric card 12.

Also shown in FIG. 3 are power connectors 37 on the midplane and power connectors 39 on the fabric cards 12.

There has been described a system with 24 line cards with 144 ports each, realized through 48 physical cable connectors that each carry 3 links. The switch fabric structure of each line card 14 is fully connected, so the line card 14 itself can be viewed upon as a fully non-blocking 144 port switch. In addition each line card 14 has 144 links that are connected to 18 fabric cards. The 18 fabric cards then connect all the line cards 14 together in a 5-stage non-blocking Clos topology.

Figure 4A:
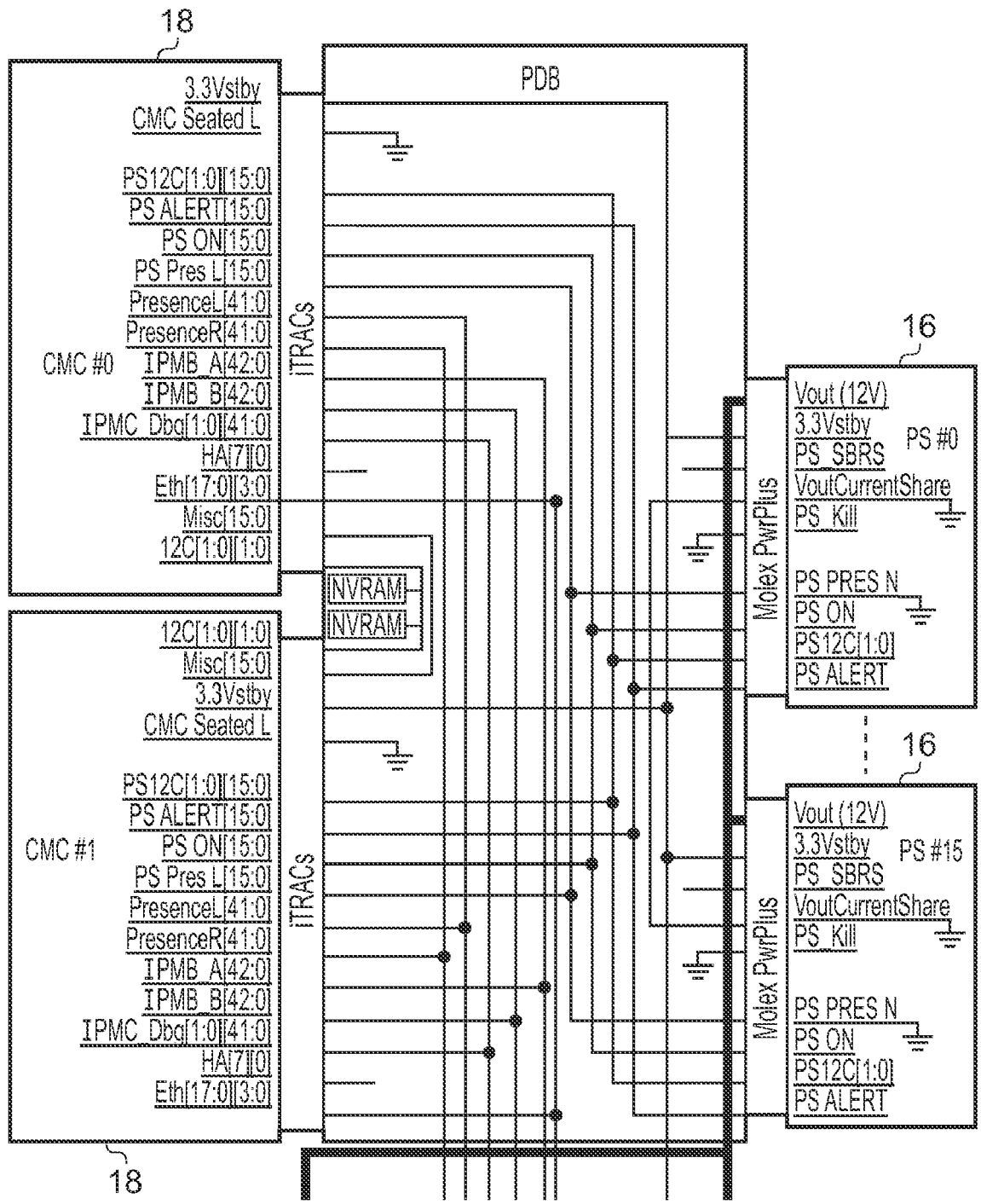
FIG. 4A is a schematic diagram of an example management infrastructure.
Figure 4B:
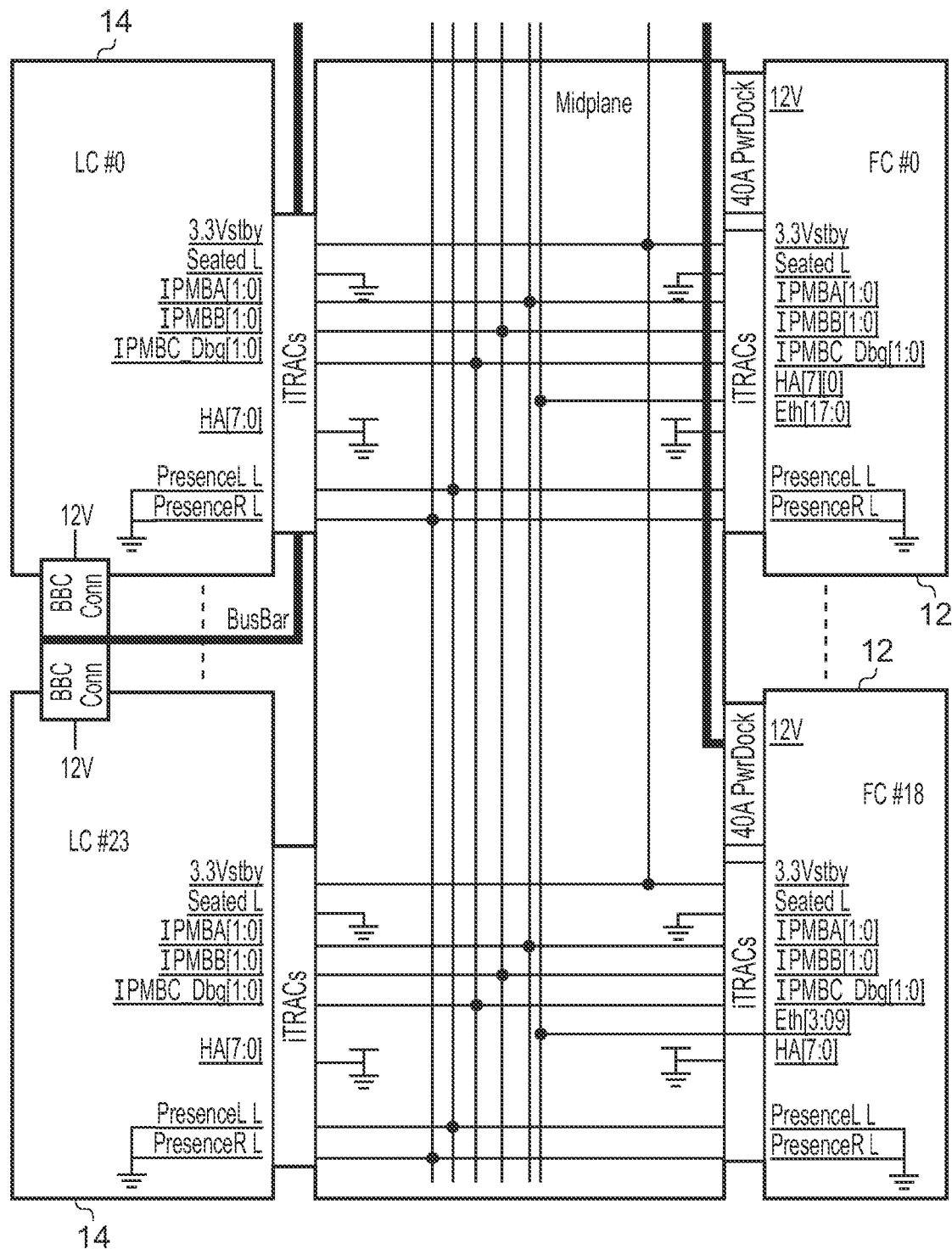
FIG. 4B continues the schematic diagram of FIG. 4A.

FIGS. 4A and 4B are schematic diagrams of an example management infrastructure. This example provides redundant chassis management controllers 18. In addition each fabric card 12 and line card 14 supports an management controller. There are redundant management connections from each chassis management controller 18 to each of the fabric card and line card management controllers. In addition there are I2C connections to each of the power supply units 16. The management connections pass between the fabric cards 12, the line cards 14, the power supply units 16 and the chassis management cards 18 via the midplane and the power distribution board 22 in the present example.

FIGS. 5 to 11 provide various schematic views of an example of a switch chassis in accordance with the invention.

Figure 5:
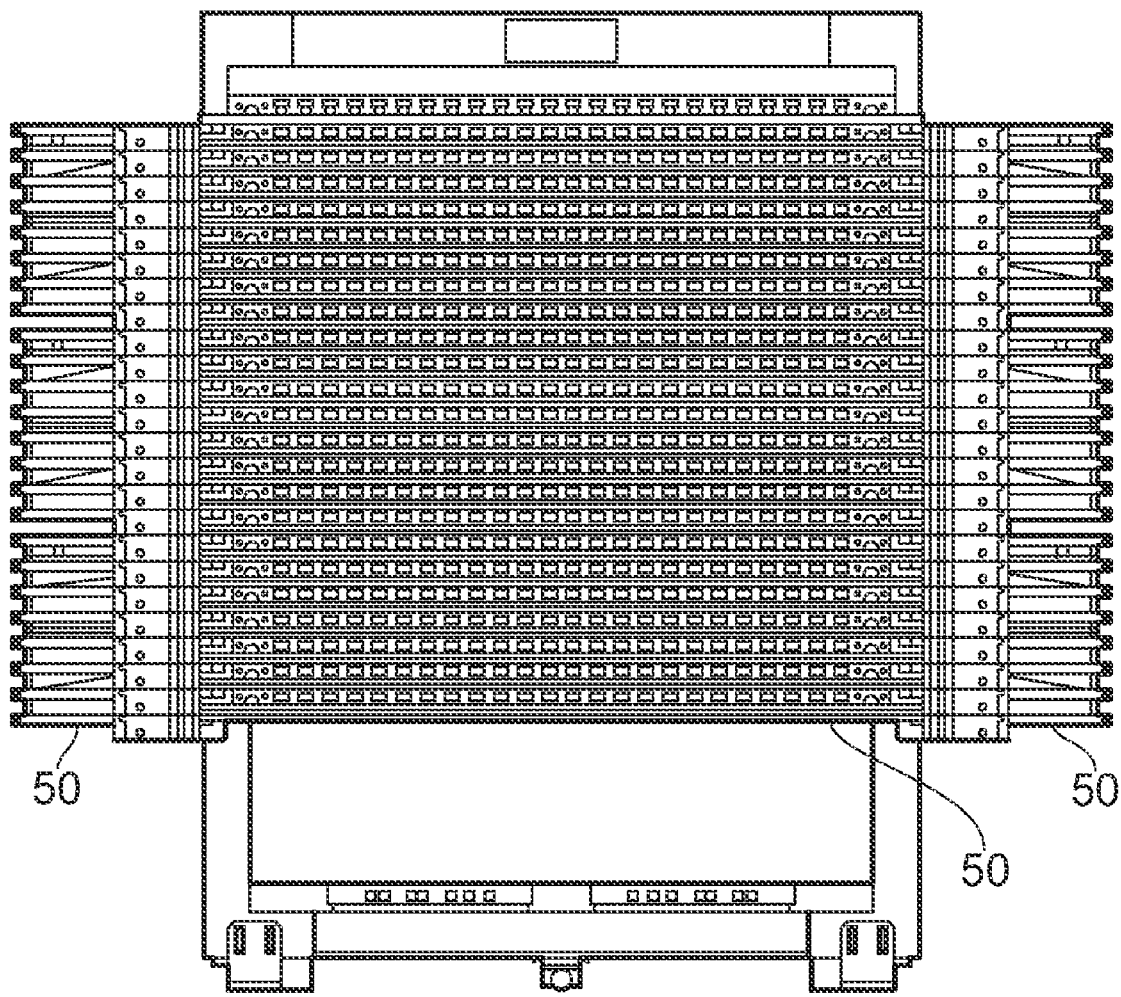
FIGS. 5 to 11 are views of an example of a switch chassis.
Figure 6:
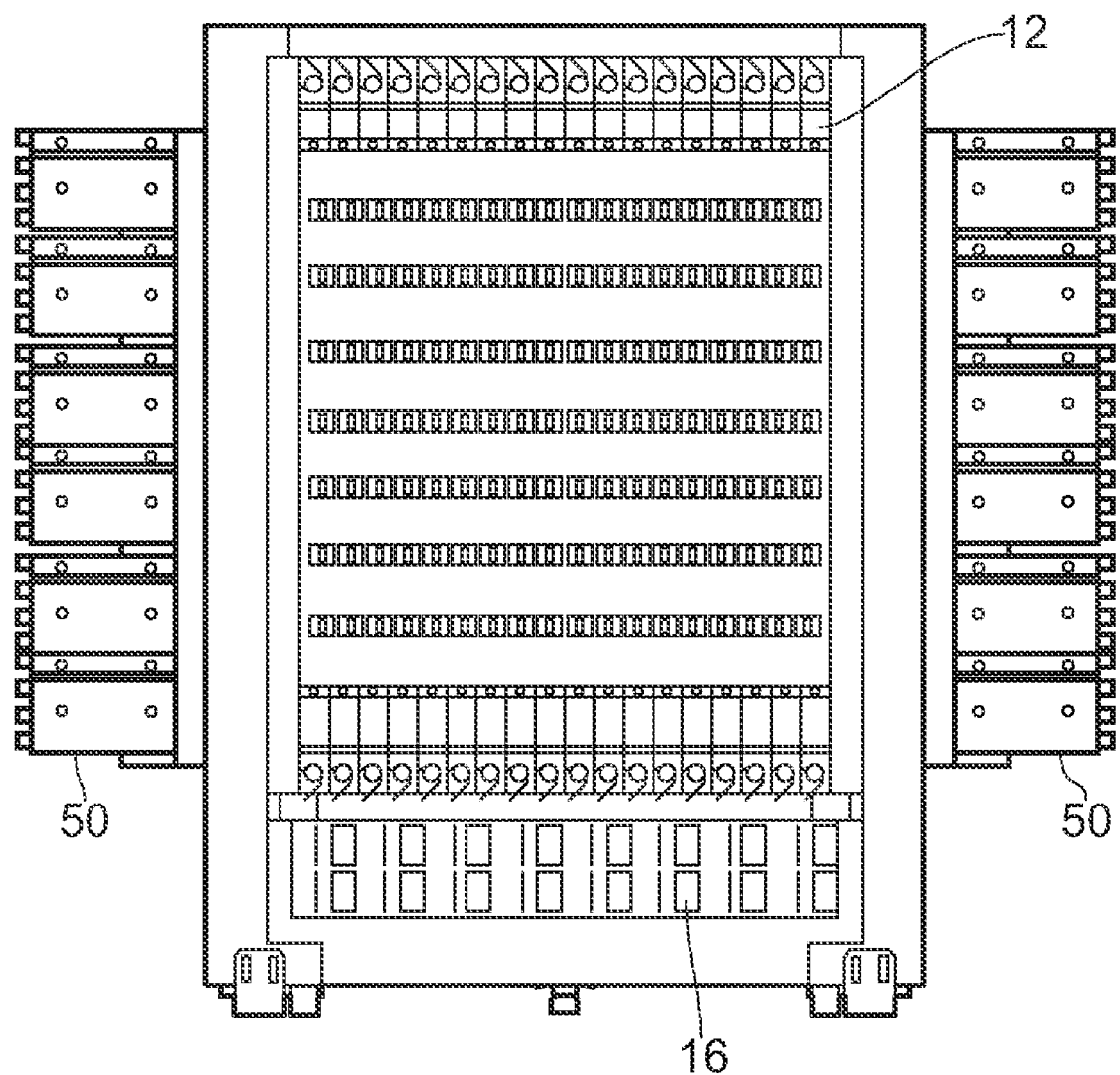
Figure 7:
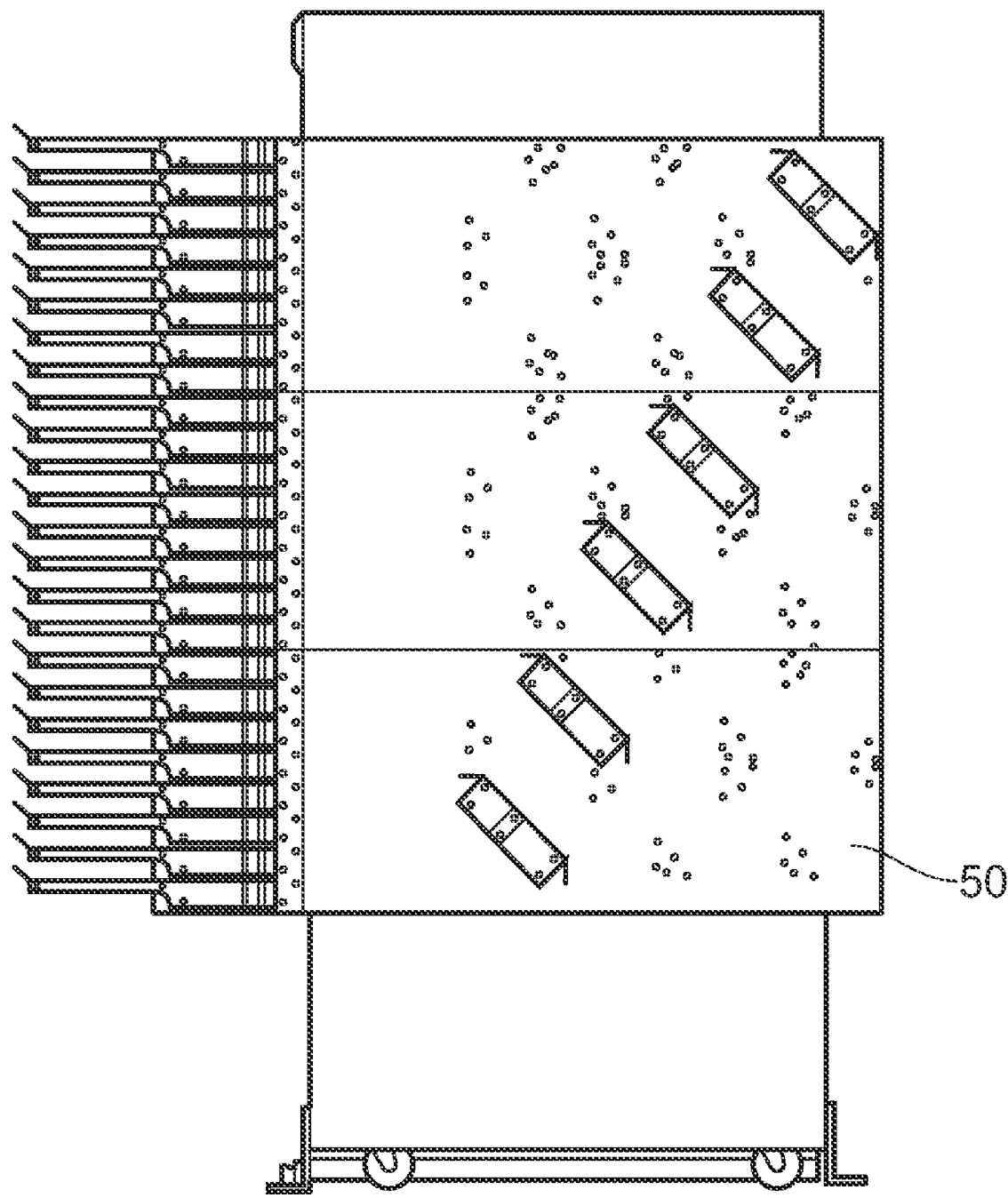
Figure 8:
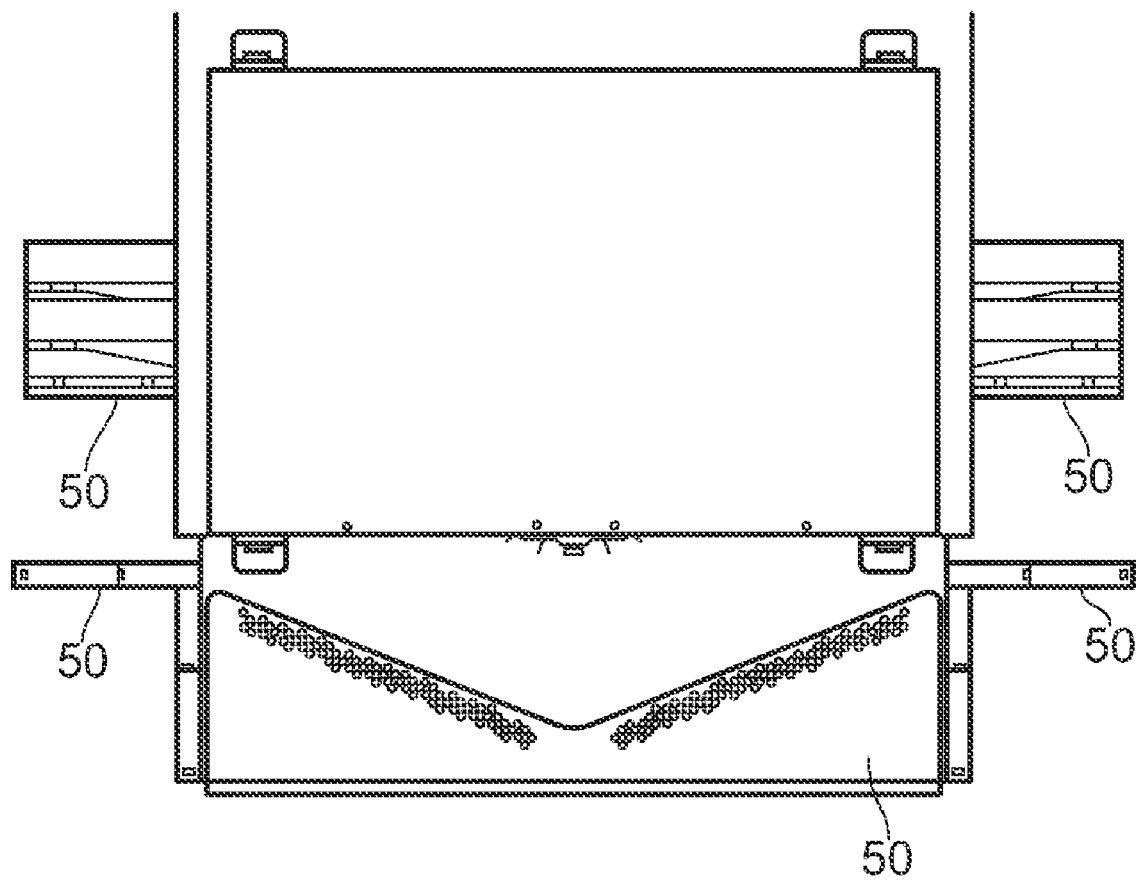
Figure 9:
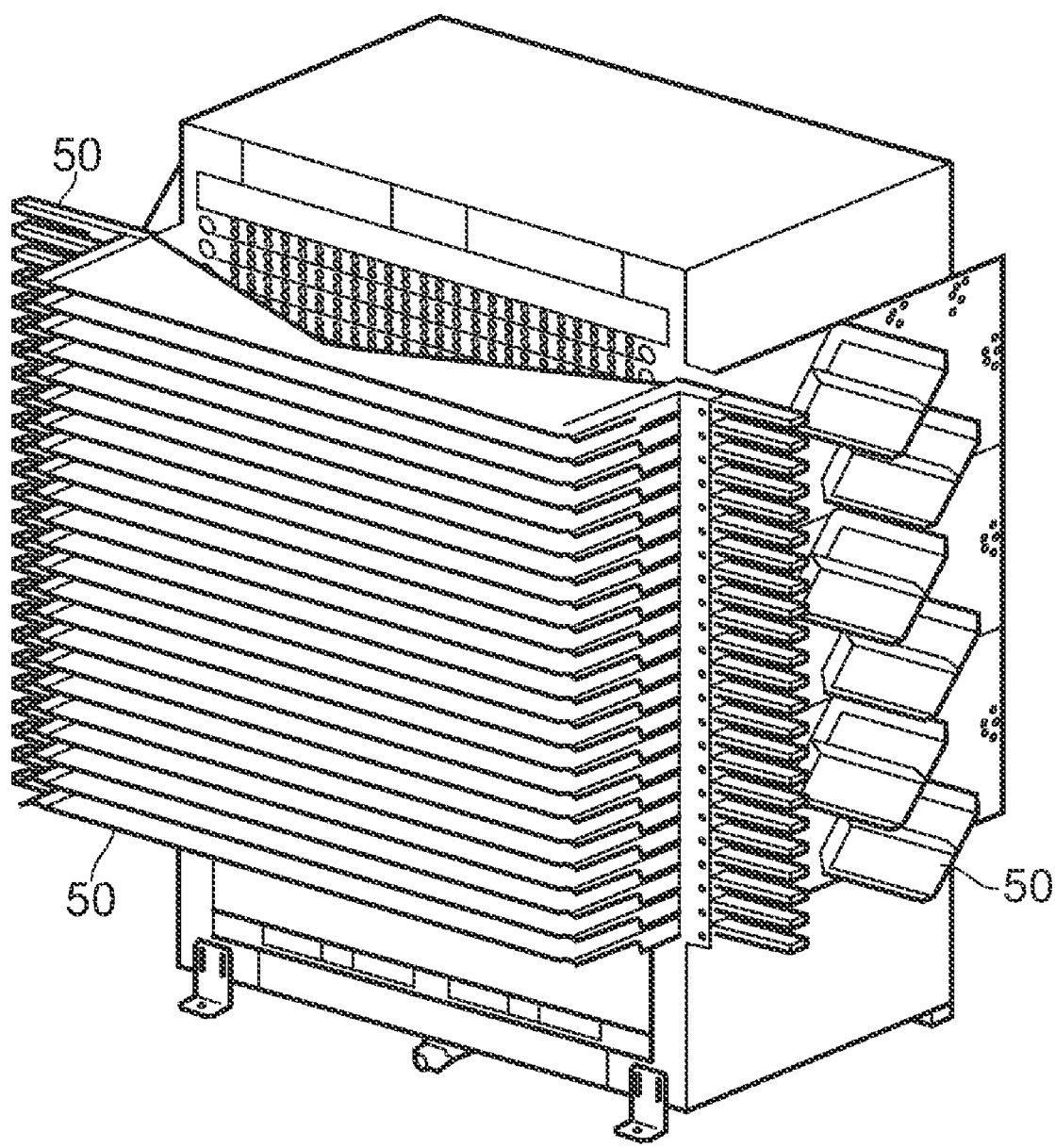
Figure 10:
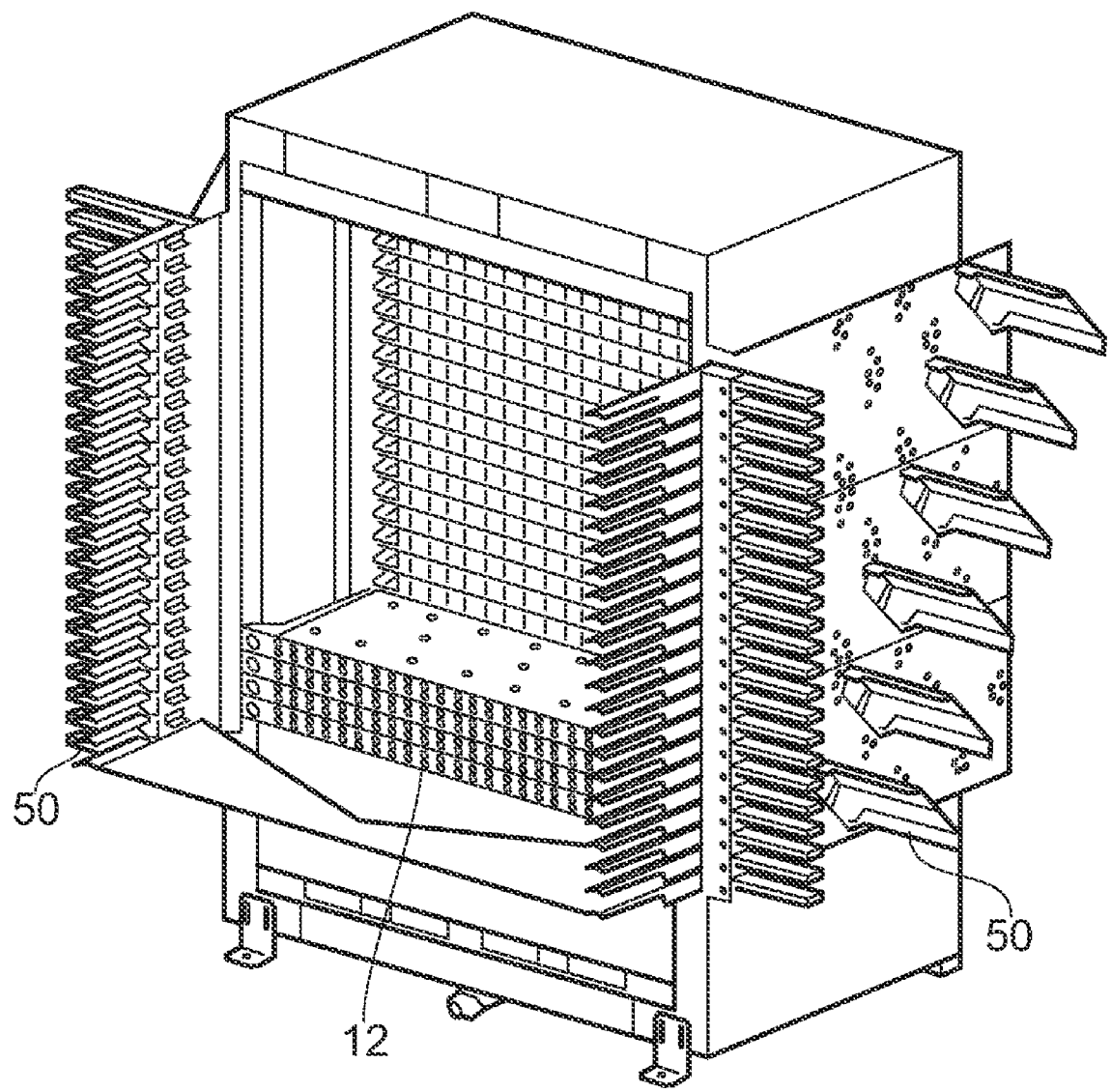
Figure 11:
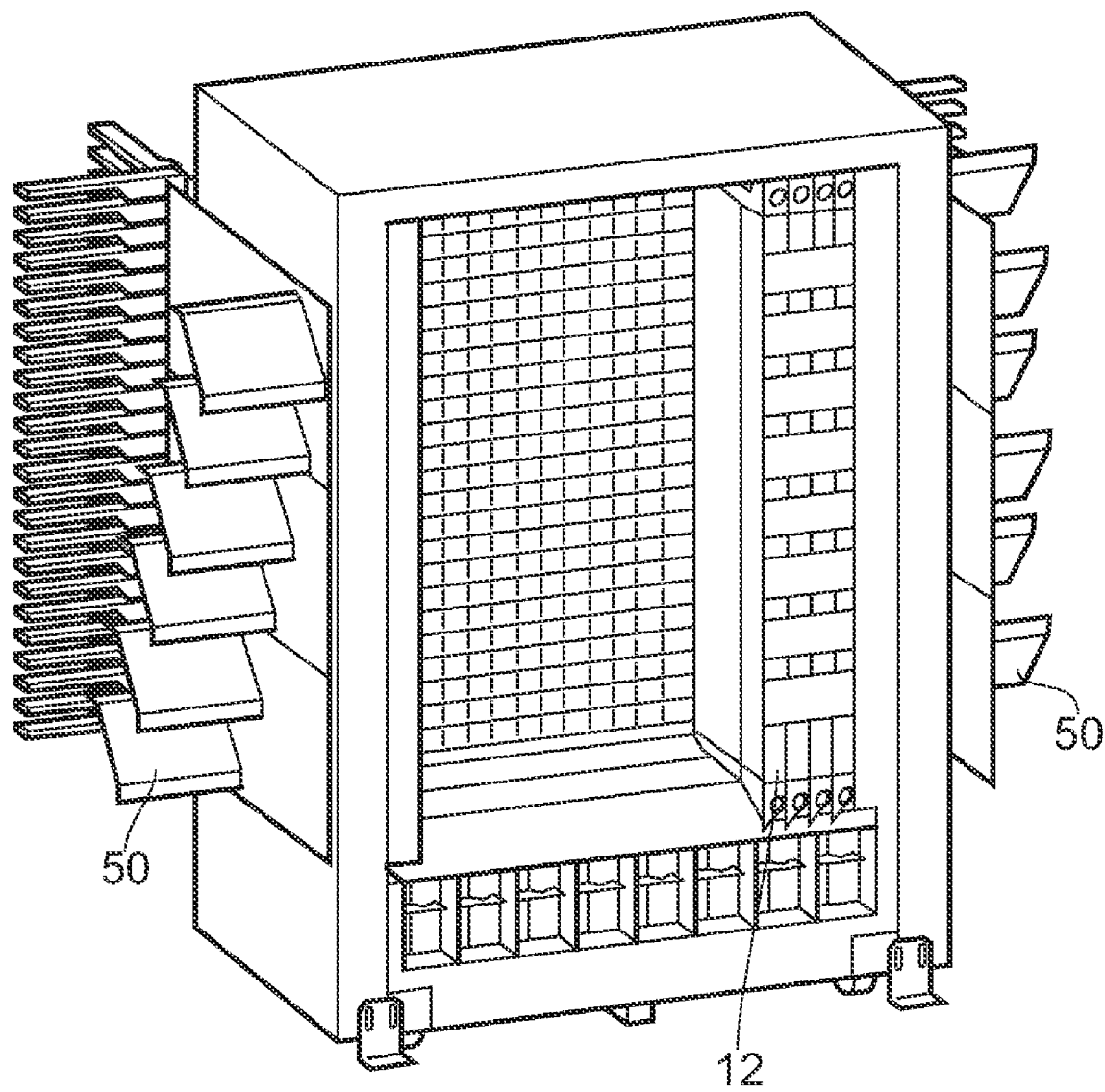

FIG. 5 is a front view of the switch chassis 10 showing cable management structures 50. FIG. 6 is a rear view of the switch chassis 10 showing the fabric cards 12, the power supply units 16 and cable management structures 50. FIG. 6 is a side view of the switch chassis 10 further showing the cable management structures 50. FIG. 8 is a side view of the switch chassis 10 further showing the cable management structures 50. FIG. 9 is an isometric view of the switch chassis 10 from the line card 14 (front) side further showing the cable management structures 50. FIG. 10 is an isometric view of the switch chassis 10 from the line card 14 (front) side showing four line cards 12 installed horizontally in the chassis 10 and part of the cable management structures 50. FIG. 11 is an isometric view of the switch chassis 10 from the fabric card 12 (rear) side showing four fabric cards 12 installed vertically in the chassis 10 and part of the cable management structures 50.

Figure 12:
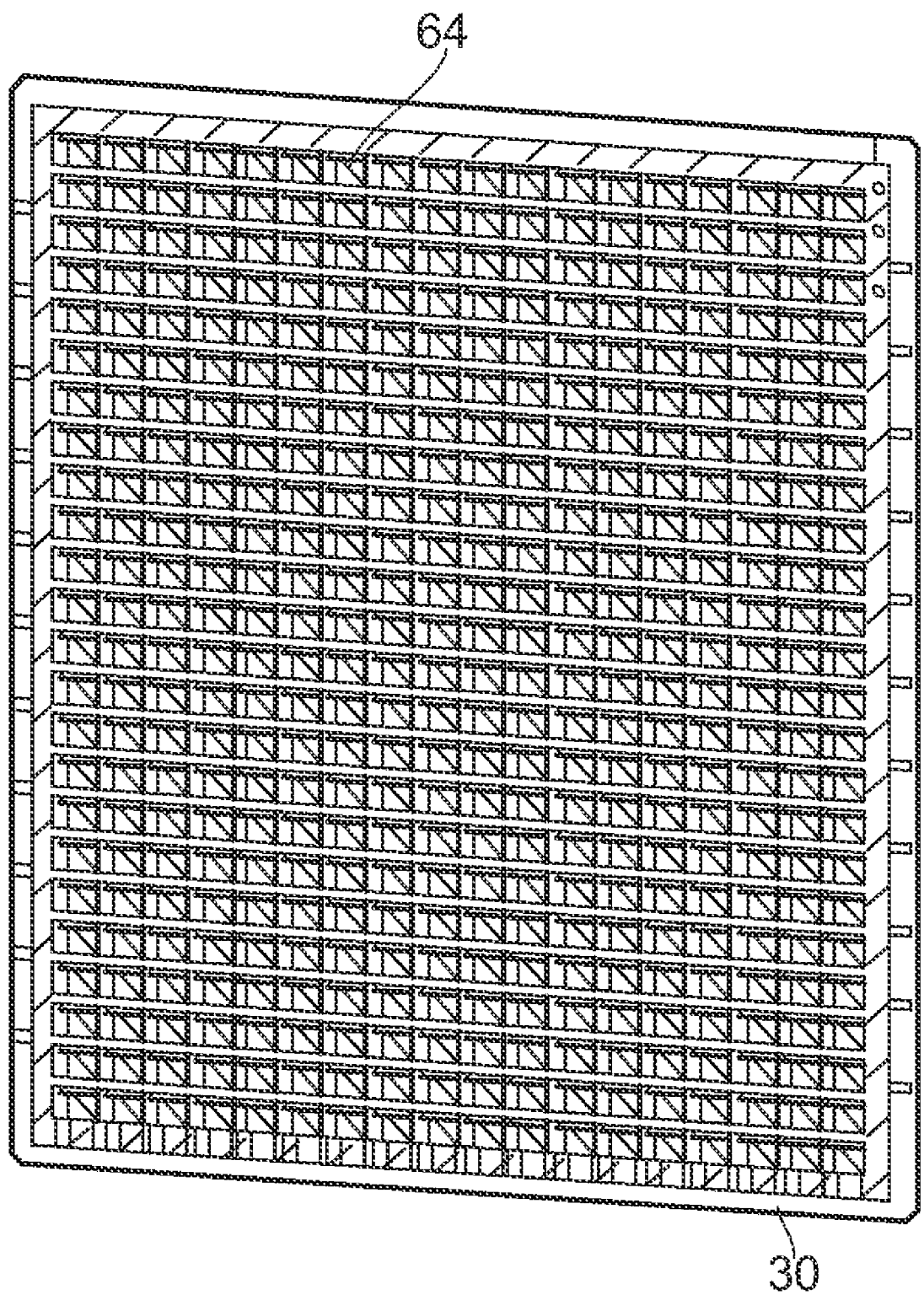
FIG. 12 is a first isometric view of an example of a midplane.
Figure 13:
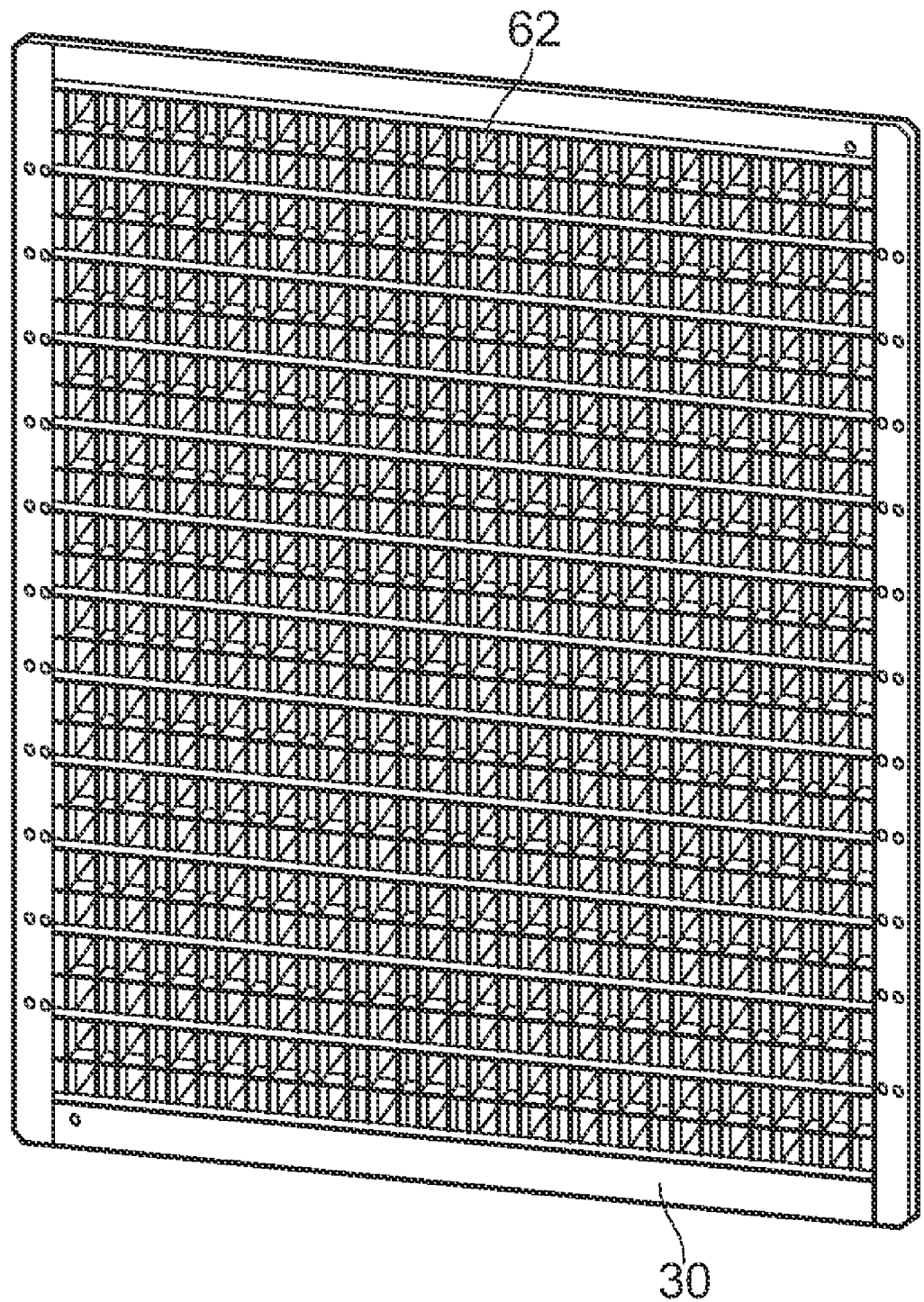
FIG. 13 is a further isometric view of an example of a midplane.

FIGS. 12 and 13 provide various schematic views of an example of a midplane 30 in accordance with the invention. FIG. 12 is an isometric view of the midplane 30 from the line card 14 (front) side and FIG. 13 is an isometric view of the midplane 30 from the fabric card 12 (rear) side. FIG. 12 shows the array formed from rows and columns of the second connectors 64 of the midplane connectors pairs 32 described with reference to FIG. 3. FIG. 13 shows the array formed from rows and columns of the first connectors 62 of the midplane connectors pairs 32 described with reference to FIG. 3.

Figure 14:
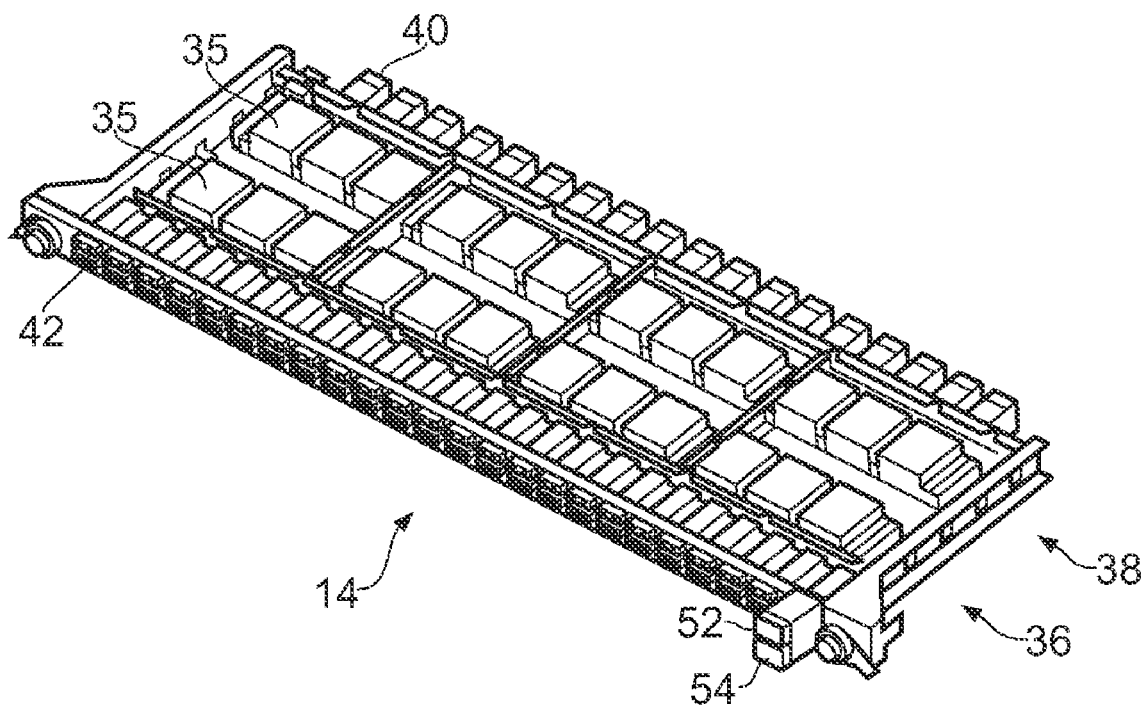
FIG. 14 is an isometric view of an example of a line card.

FIG. 14 is an isometric view of an example of a line card 14. This shows the first and second rows 36 and 38 of switch chips 35, the line board connectors 40 and the cable connectors 42. As can be seen in FIG. 14, the cable connectors 42 are stacked double connectors such each cable connector can connect to two cables 52 and 54.

Figure 15:
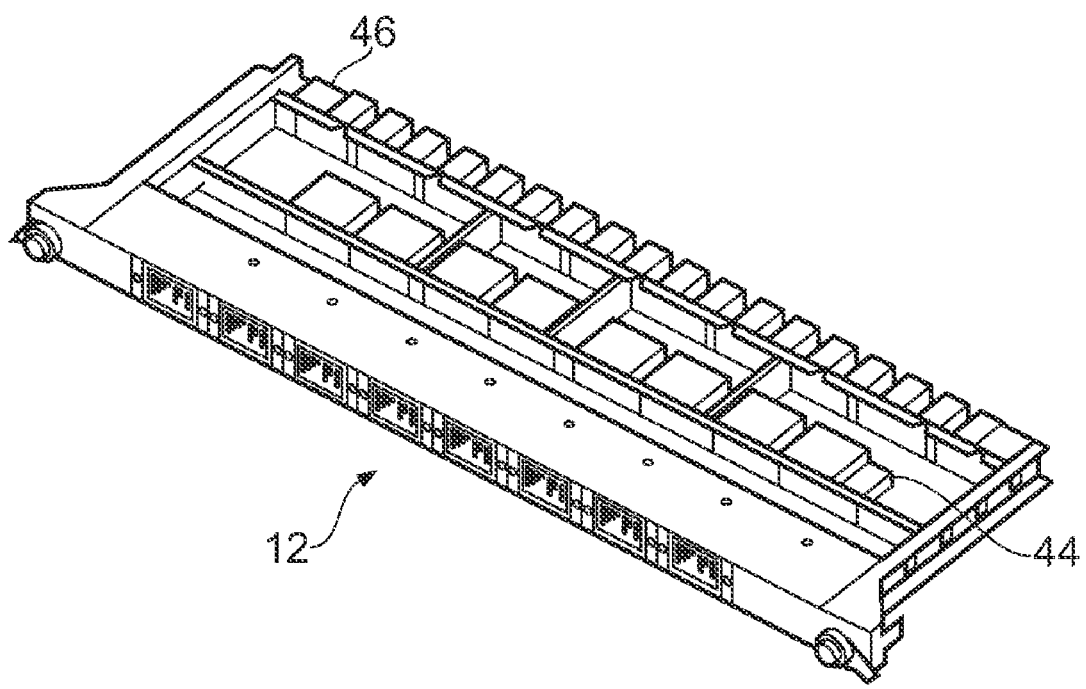
FIG. 15 is an isometric view of an example of a fabric card.

FIG. 15 is an isometric view of an example of a fabric card 12. This shows the fabric card connectors 46 and the switch elements 44.

Figure 16:
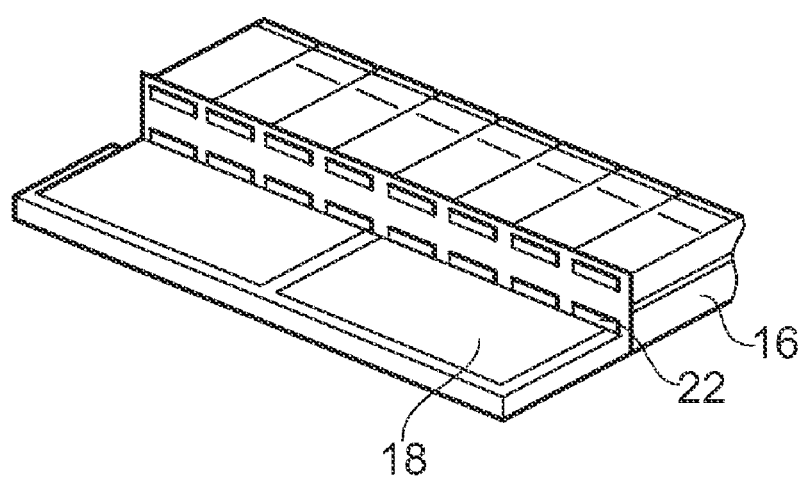
FIG. 16 is schematic representations of part of a switch chassis.

FIG. 16 is a schematic representation of an example of two chassis management controllers 18 plugged into one side of a power distribution board 22 and 16 power supply units 16 plugged into the other side of the power distribution board 22. In the present example, the chassis management controllers

Figure 17:
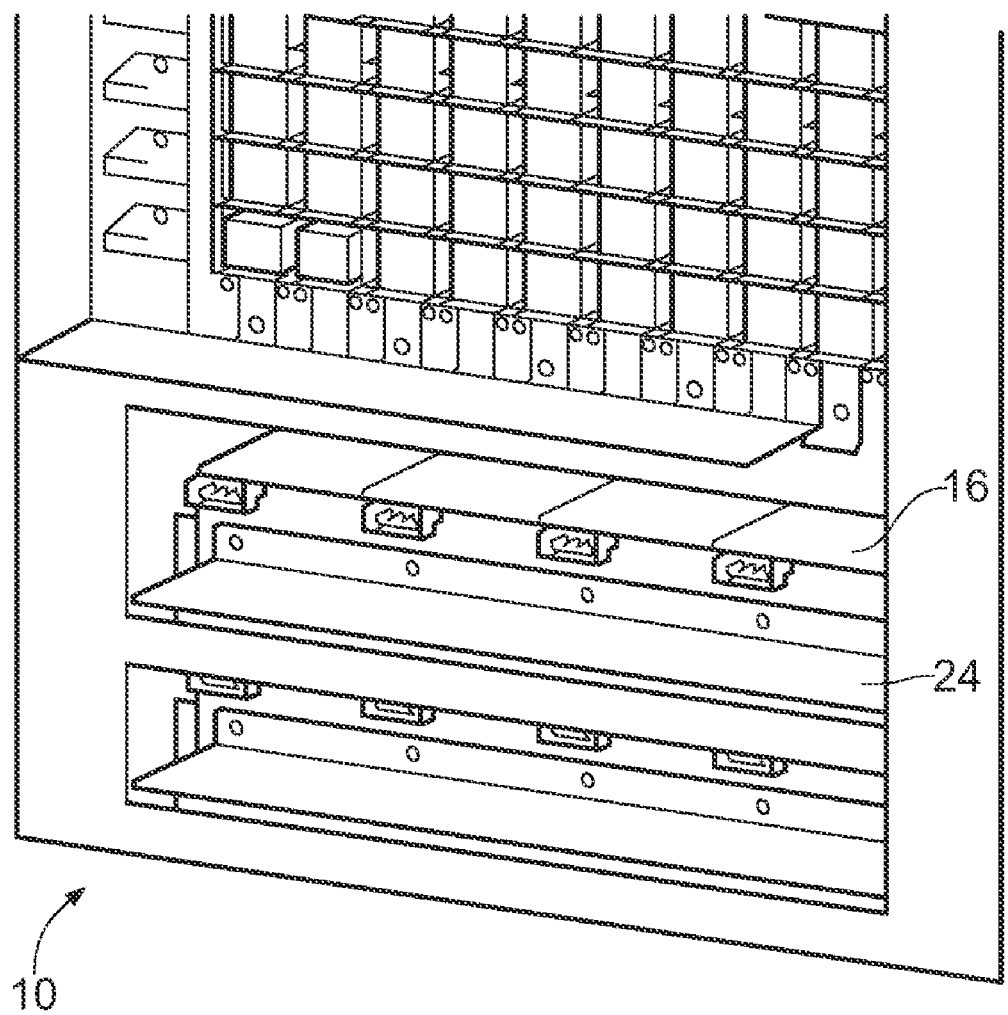
FIG. 17 is a further schematic representation of part of a switch chassis.

18 are plugged into the front side of the power distribution board 22 and the power supply units 16 are plugged into the rear side of the power distribution board 22 as mounted in the switch chassis. FIG. 17 illustrates bus bars 24 for a 3.3V standby supply.

In the present example the midplane 30 is a passive printed circuit board that has dimensions of 1066.8 mm (42")×908.05 mm (35.75")×7.1 mm (0.280"). The active area is 40"×34". 864 8×8 midplane connectors (432 midplane connectors per side) are provided. There is a ribbon cable connection the power distribution board 22 and a 3.3V standby copper bar to the power distribution board 22.

In the present example a fabric card 12 comprises a printed circuit board with dimensions of 254 mm (10")×1016 mm (40")×4.5 mm (177"). It comprises 24 8×8 fabric card connectors 46, one power connector 39, 8 fan module connectors and 8 switch chips 44.

In the present example a line card 14 comprises a printed circuit board with dimensions of 317.5 mm (12.5")×965.2 mm (38")×4.5 mm (177"). It comprises 24 stacked cable 168-circuit connectors 42, 18 8×8 card connectors 40, 1 busbar connector and 24 switch chips 35.

In the present example a power distribution board 22 comprises a printed circuit board, 16 power supply DC connectors, 14 6×6 card connectors (7 connectors per chassis management card 18, ribbon cable connectors for low-speed connectivity to the midplane 30, and a 3.3V standby copper bar to the midplane 30.

In the present example a chassis management card 18 comprises 14 6×6 card connectors (7 connectors per chassis management card), two RJ45 connectors for Ethernet available on a chassis management card panel, two RJ45 connectors for serial available at the chassis management card panel, .three RJ45 for line card/fabric card debug console access at the chassis management card panel, three HEX rotary switches used to select between which line card/fabric card debug console is connected to the three RJ45s above, and a 220-pin connector for the mezzanine.

In the present example a mezzanine has dimensions: 92.0 mm×50.8 mm and comprises 4 mounting holes screw with either 5 mm or 8 mm standoff from the chassis management card board, a 220-pin connector for connectivity to chassis management board.

Figure 18:
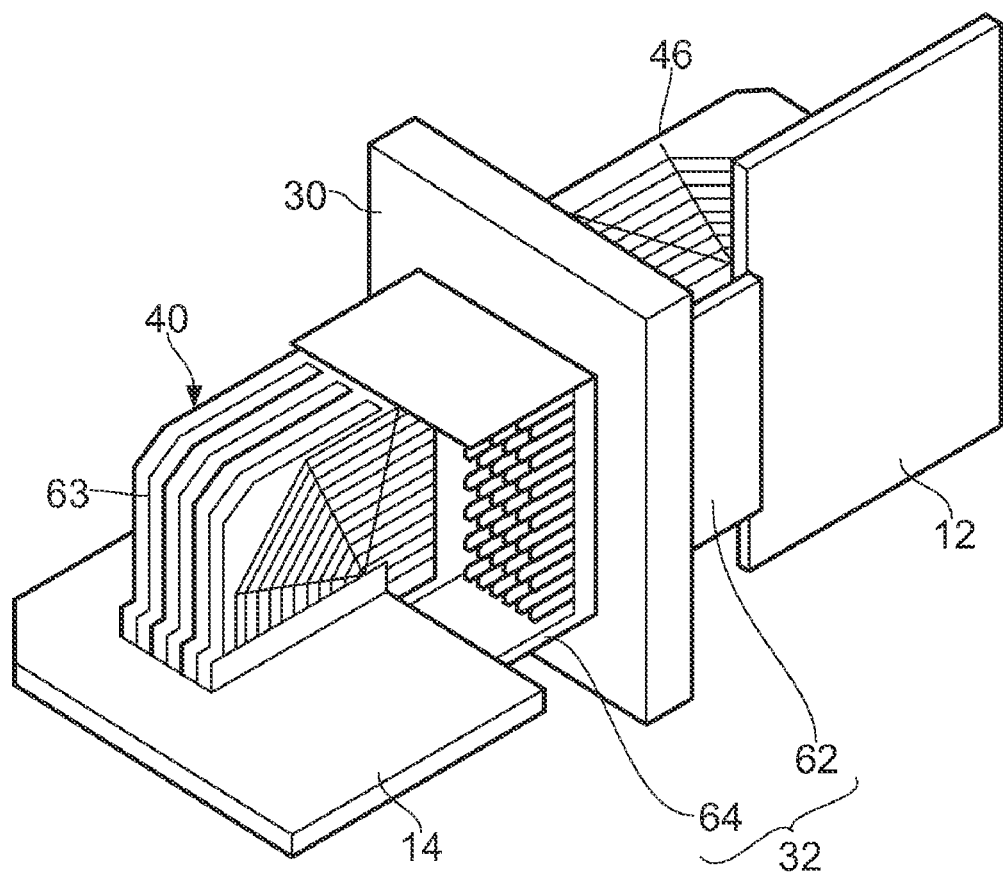
FIG. 18 is a schematic representation of the connections of two cards orthogonally with respect to each other.

FIG. 18 is a schematic isometric view of an example of a midplane connector pair 32. As can be seen in FIG. 18, the connector comprises a first, fabric side, connector 62 and a second, line card side, connector 64. In this example, each of the connector 62 and 64 is substantially U-shaped and comprises an 8×8 array of contact pins.

It will be noted that the second connector 64 of the midplane connector pair 32 is rotated through substantially 90 degrees with respect to the first connector 62. The first connector 62 is configured to connect to a corresponding fabric card connector 46 of a fabric card 12. The second connector 62 is configured to connect to a corresponding fabric card connector 46 of a line card 14. Through the orientation of the second connector 64 of the midplane connector pair 32 substantially orthogonally to the orientation of the first connector 62, it can be seen that the line card 14 is mounted substantially orthogonally to the fabric card 12. In the present example the line card 14 is mounted substantially horizontally and the fabric card is mounted substantially vertically 12.

Each of the contact pins on the connector 62 is electrically connectable to a corresponding contact of the fabric card connector 46. Each of the contact pins on the connector 64 is electrically connectable to a corresponding contact of the line card connector 40. The connector pins of the respective connectors 62 and 64 are connected by means of pass-through vias in the midplane 30 as will now be described in more detail.

Figure 19:
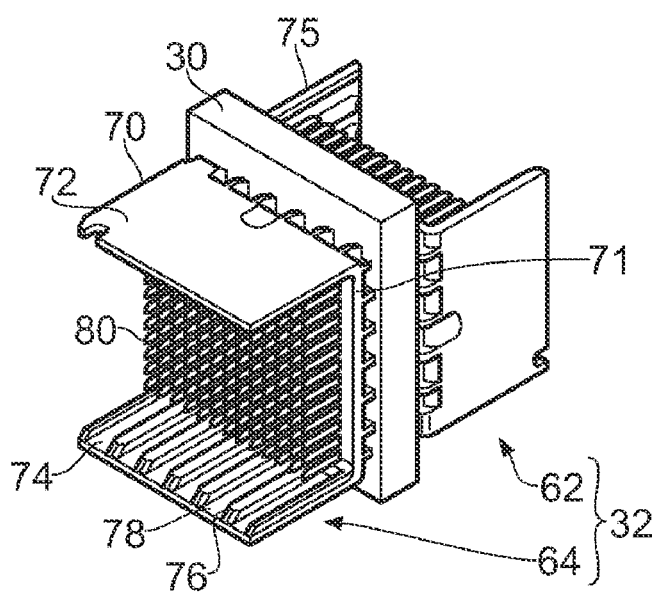
FIG. 19 is a schematic representation of an example of orthogonally arranged connectors.

FIG. 19 illustrates an example of the configuration of a first midplane connector 62 and a second midplane connector 64 of a midplane connector pair 32 in more detail. In the example shown in FIG. 19 that second connector 64 (the line card side connector) comprises a substantially U-shaped frame 70 including a substantially planar base 71 and first and second substantially planar walls 72 and 74 that extend at substantially at 90 degrees from the base 71. The inside edges of the first and second substantially planar sides 72 and 74 are provided with ridges 76 and grooves 78 that provide guides for the line card connector 40.

As can be seen in FIG. 18, the line card connector 40 has a structure that comprises a plurality of contact planes 63 that are aligned side by side, such that it has a generally planar construction that extends up from the line card 14. Line card connector planes comprise printed circuit boards carrying traces leading to contacts. The traces and contacts can be provided on both sides of the printed circuit boards of the line card connector planes.

By comparing FIGS. 18 and 19, it can be seen that each contact plane 63 of the line card connector 40 can be entered into a respective one of the grooves 78 so that connectors of the line card connector 40 can then engage with contact pins 80 of the second connector 64. In the case of the line card side connector portion 64, the orientation of second connector 64 and the grooves 78 therein means that the line card 12 is supported in a substantially horizontal orientation. In the example shown in FIG. 19, an 8×8 array of connector pins 80 is provided.

The first midplane connector 62 (fabric card side connector) of the midplane connector pair 32 has substantially the same form as the second midplane connector 62 of the midplane connector pair 32, except that it is oriented at substantially 90 degrees to the second midplane connector 64. In this example the second midplane connector 62 comprises a substantially U-shaped support frame 75 including a substantially planar base and first and second substantially walls and that extend at substantially at 90 degrees from the base. The inside edges of the first and second substantially planar sides are provided with ridges and grooves that provide guides for the fabric card connector 46. The fabric card connector 46 has the same basic structure as that of the line card connector 40 in the present instance. Thus, in the same way as for the line card connector, each of a plurality of contact planes of the fabric card connector 46 can be entered into a respective one of the grooves so that connectors of the fabric card connector 46 can then engage with contact pins of the first connector 62. The orientation of the first connector 62 and the grooves therein means that the fabric card 12 is supported in a substantially vertical orientation.

In the example illustrated in FIG. 19, the orthogonal connector 60 provides an 8×8 array of connector pins 80 is provided that can support supports 64 differential pairs or 32 bi-directional serial channels (two wires per direction) in a footprint of 32.2×32.2 mm.

As mentioned above, the contact pins of the first and second midplane connectors 62 and 64 of a midplane connector pair 32 are connected by means of pass through vias in the midplane.

Figure 20:
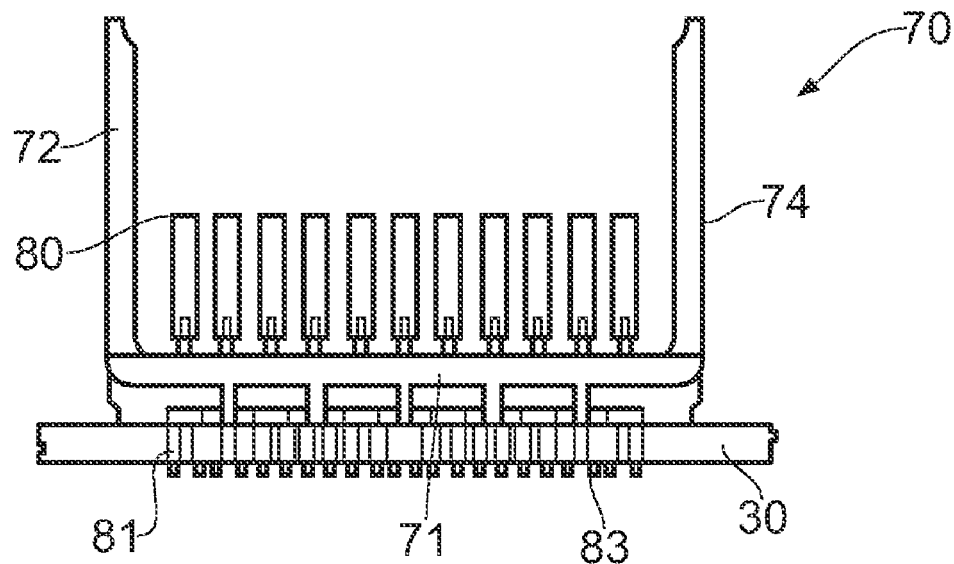
FIG. 20 is a schematic side view of one of the connectors of FIG. 19.

FIG. 20 illustrates a side view of an example of a midplane connector, for example the midplane connector 62 mounted on the midplane. In the example shown in FIG. 20 the midplane connector 64 comprises a substantially U-shaped frame 70 including a substantially planar base 71 and first and second substantially planar walls 72 and 74 that extend at substantially at 90 degrees from the base 71. The contact pins 80 are each connected to pairs of contact tails 81 that are arranged in sprung pairs that are arranged to be push fitted into pass through vias 83 in the midplane 30.

In use, the other midplane connector (e.g., the first midplane 62) of the midplane connector pair would be inserted into the pass through vias in the other side of the midplane 30 in the orthogonal orientation as discussed previously.

Figure 21:
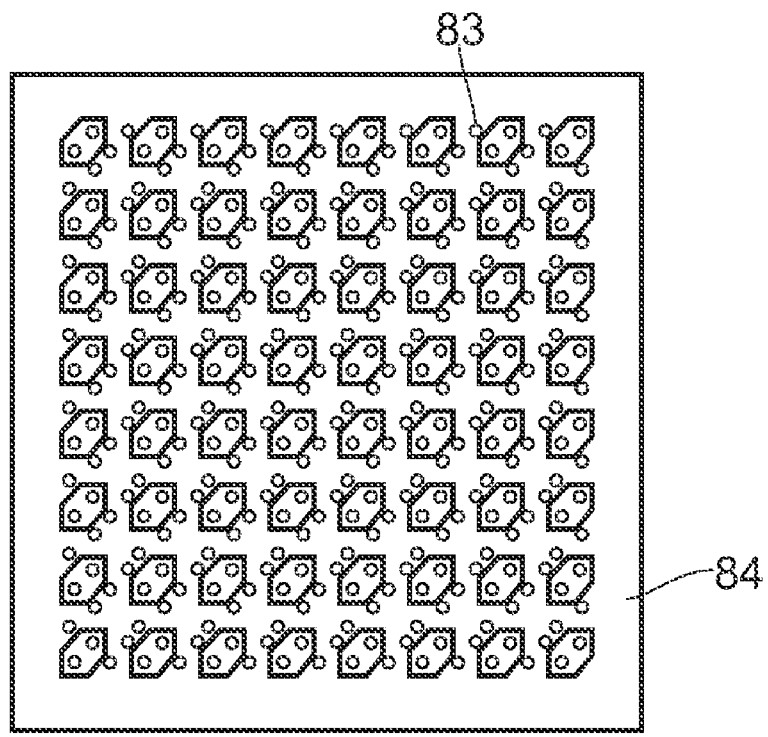
FIG. 21 is a plan view of an example configuration of vias for the orthogonal connector pairing of FIG. 19.
Figure 22:
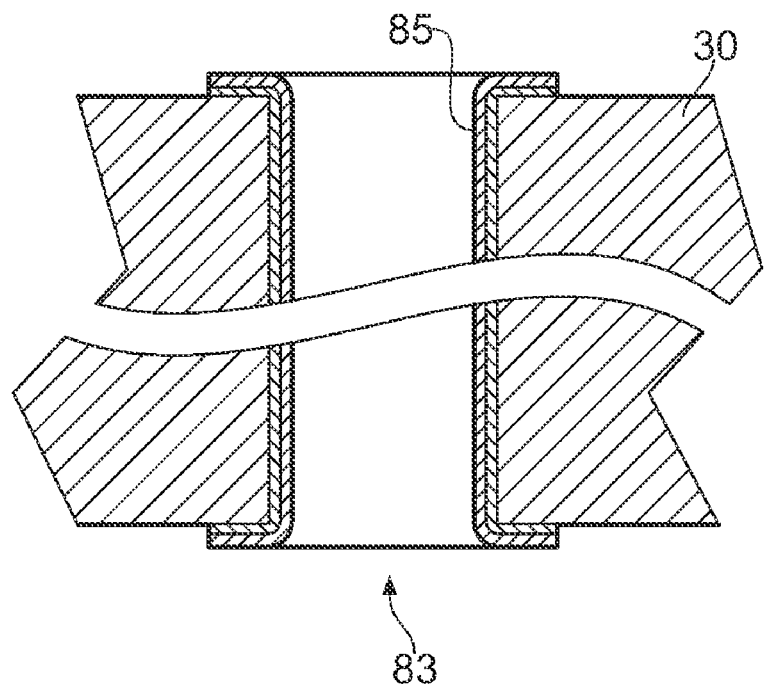
FIG. 22 is a cross-section through of a via.

FIG. 21 is a schematic representation of an area of the midplane for receiving the midplane connectors 62 and 64 of the midplane connector pair 32. This shows the array of vias 83. FIG. 22 is a schematic cross-section though such a via 83 in the showing the conductive wall 85 of the via 83. The conductive wall 85 can be formed by metal plating the wall of the via, for example.

Figure 23:
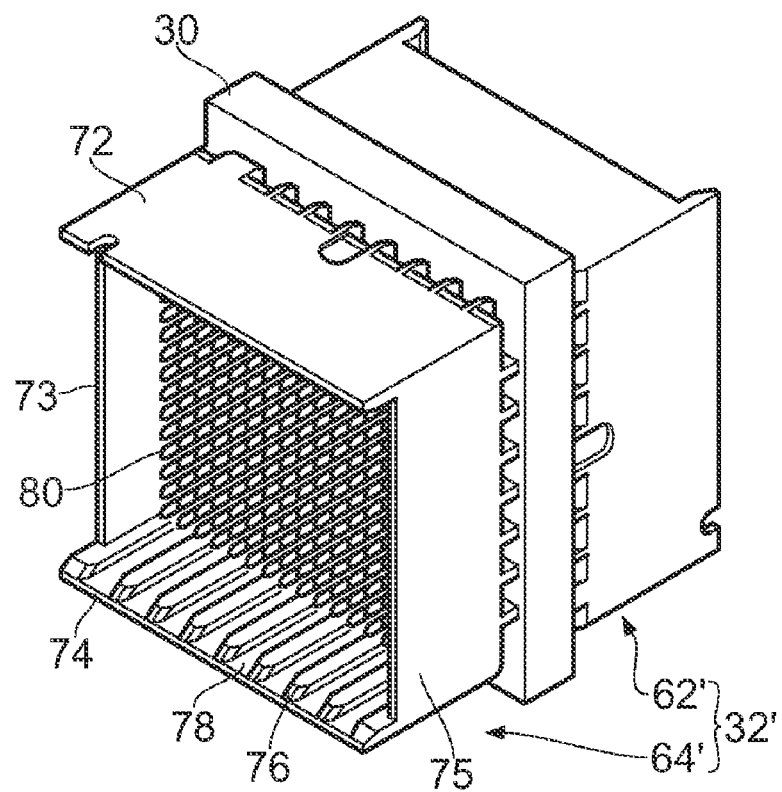
FIG. 23 is a schematic side view of example of an alternative to the connector of FIG. 20.

The examples of the midplane connectors described with reference to FIGS. 18 and 20 had a generally U-shape. However, other configurations for the midplane connectors are possible. For example FIG. 23 illustrates another example of a midplane connector pair 32', where the first and second midplane connectors 62' and 64' are generally the same as the first and second midplane connectors 62 and 64 described with reference to FIG. 19 except that, in addition to the first and second walls 72 and 74, third and fourth walls 73 and 75 are provided. The additional walls provide a generally box-shaped configuration that can facilitate the insertion and support for the cards to be connected thereto.

It will be appreciated that in other examples the first and second midplane connectors could have different shapes and/or configurations appropriate for the connections for the cards to be connected thereto.

The array of midplane connector pairs 32 as described above provides outstanding performance in excess of 10 Gbps over a conventional FR4 midplane because the orthogonal connector arrangements allow signals to pass directly from the line card to the fabric card without requiring any signal traces on the midplane itself. The orthogonal arrangements of the cards that can result from the use of the array of orthogonally arranged connector pairs also avoids the problem of needing to route a large number of signals on the midplane to interconnect line and fabric cards, minimizing the number of layers required. This provides a major simplification compared to existing fabric switches. Thus, by providing an array of such orthogonal connectors, each of a set of horizontally arranged line cards 12 can be connected to each of a set of vertically aligned fabric cards without needing intermediate wiring.

Figure 24:
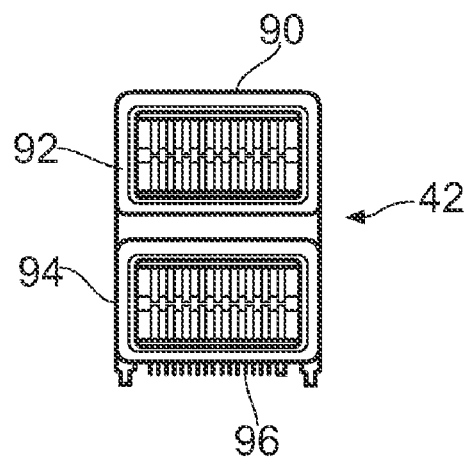
FIG. 24 is a schematic end view of an example cable connector.
Figure 25:
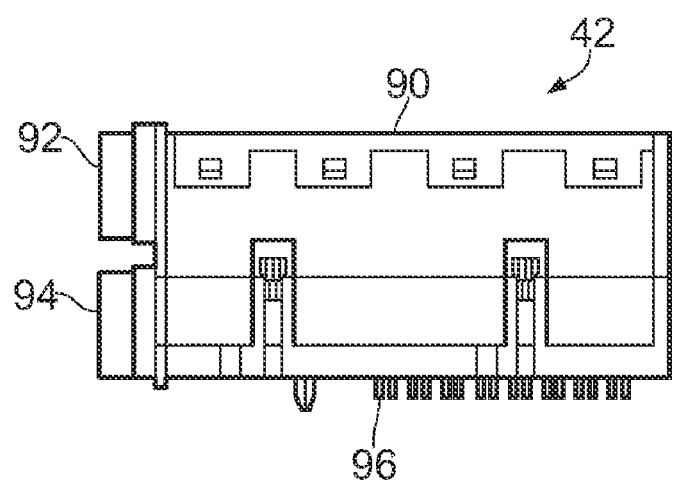
FIG. 25 is a schematic side view of the example cable connector.
Figure 26:
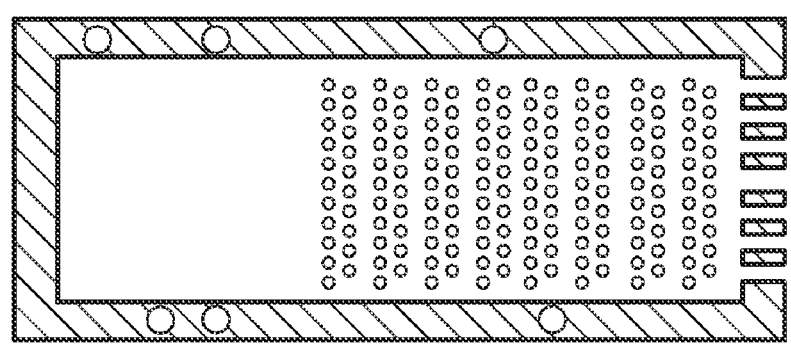
FIG. 26 represents a footprint of the cable connector.

FIGS. 24 and 25 provide an end view and a side view, respectively, of an example of a cable connector 42 as mentioned with reference to FIGS. 3 and 14. As shown in FIGS. 24 and 25, the cable connectors 24 and 25 include first and second cable connections 92 and 94 stacked within a single housing 90. This provides for a very compact design. Board contacts 96 are provided for connecting the connector to a line card 14. FIG. 26 is a plan view of the connector footprint for the board contacts 96 of the cable connector 42. The stacked arrangement facilitates the providing of line cards that are high density line cards supporting a 12× cable providing 24 line pairs with 3 4× links aggregated into a single cable. The cable connectors provide 12× cable connectors that are smaller than a conventional 4× connector, 3× denser than a standard InfiniBand 4× connector and electrically and mechanically superior. Using 12× cable (24 pairs) can be almost 50% more area efficient than three 4× cables and requires three times fewer cables to install and manage.

Figure 28:
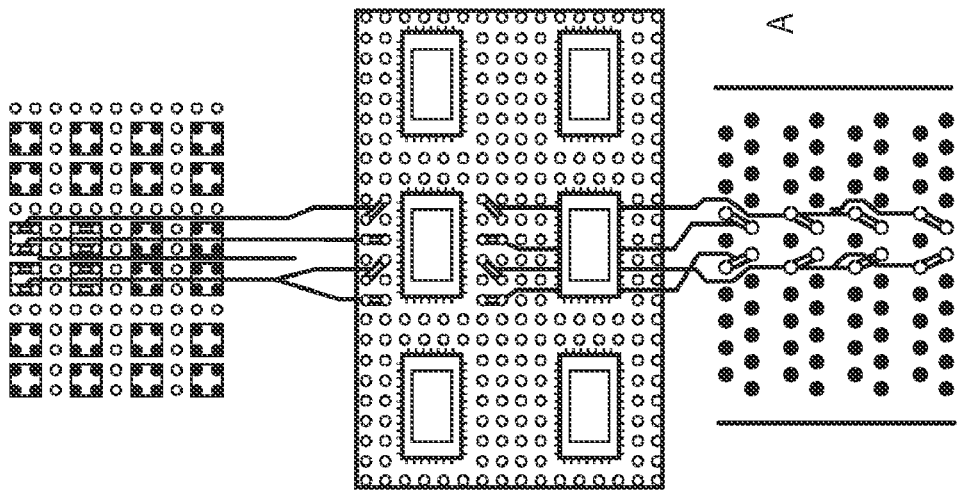
FIGS. 27 and 28 illustrates example of signal routing for a cable connector.
Figure 27:
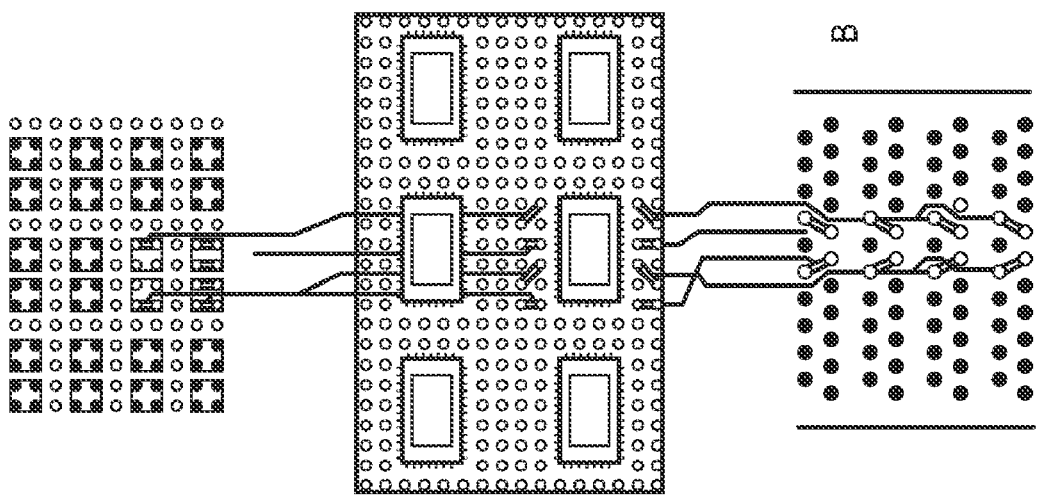

FIGS. 27 and 28 illustrate an example of the routing of signals from each of two 12× port sections 92 and 94 of a cable connector 42 to the equalizers and to a switch chip on a line card 14. FIG. 27 shown an example of routing from a first 12× port section. FIG. 28 shows an example of the routing from a second 12× port section. The transmit (Tx) lines are equalized, and can be connected directly from the switch chip to the cable connector. The can be routed on lower layers in order to minimize via stub effects.

Figure 29:
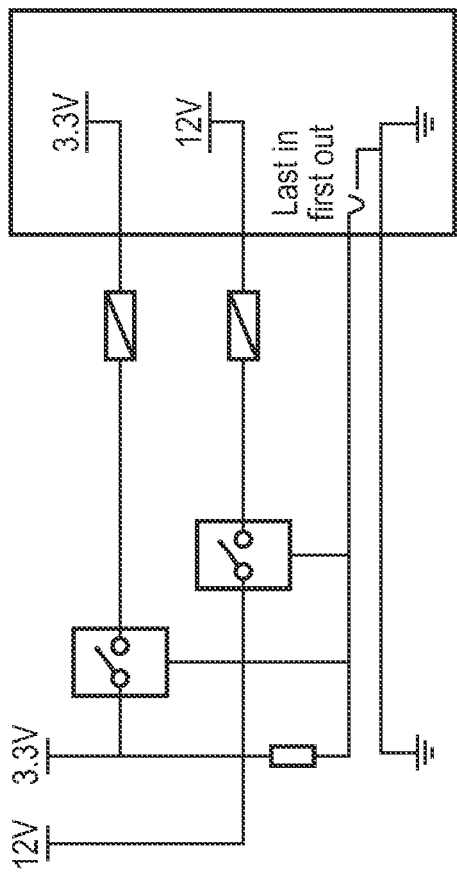
FIG. 29 illustrates an example of a power supply for the cable connector.
Figure 30:
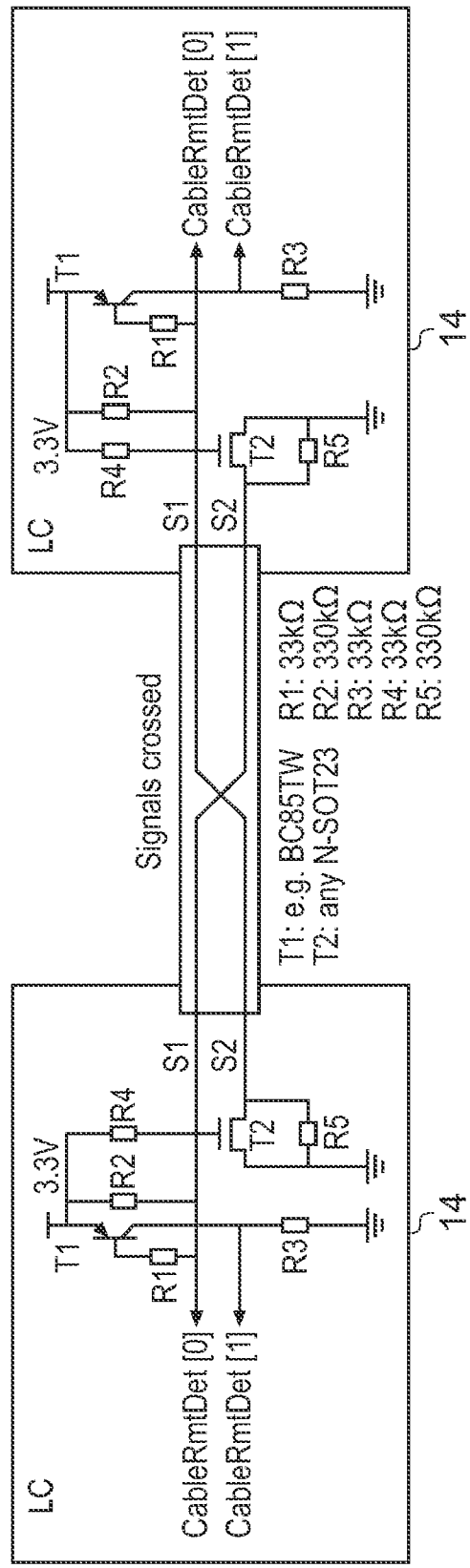
FIG. 30 illustrates an example of cable status sense detection circuitry.
Figure 31:
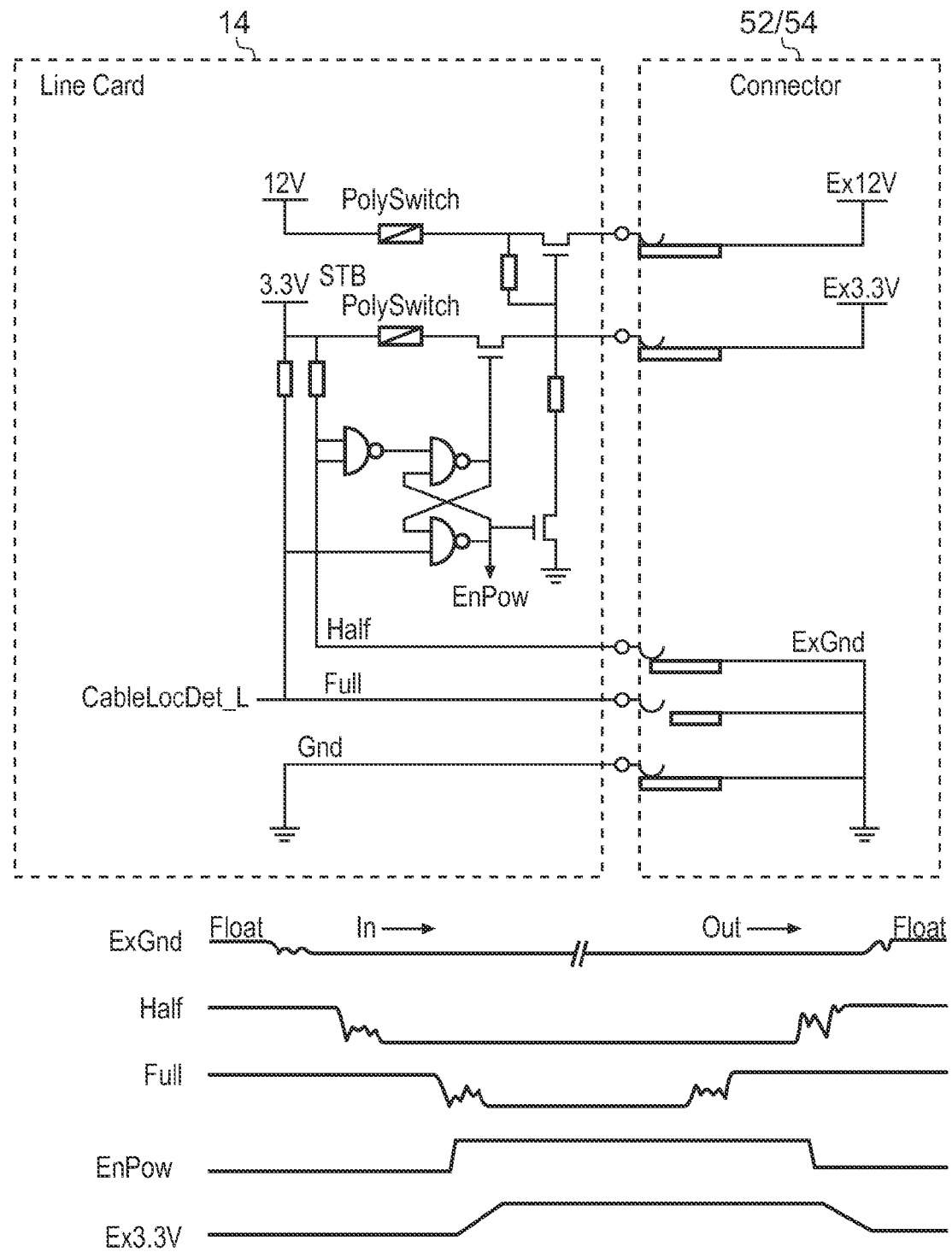
FIG. 31 illustrates an example of hot plug control circuitry.

FIG. 29 illustrates an example of a power supply for the cable connector and FIG. 30 illustrates an example of a cable status sense detection circuitry. The cable sense detection circuitry is operable to test from each end whether the other end is plugged or not, and, if plugged, to see if power from the power supply is on. Provisions are made such that "leaking" power from a powered to un-powered end is avoided. A valid status assumes that an active end is plugged. FIG. 31 is a schematic diagram of an example of a hot plug control circuit that enables hot plugging of cables. The switch chassis can thereby provide active cable support for providing active signal restoration at a cable connector. Active cable support can provides benefits of increased distances for copper cables as a result of active signal restoration at the connector, increased maximum cable distance by over 50%, using thinner and more flexible cables (e.g., reducing a cable diameter by up to 30%, which facilitates good cable management. A cable to connector interface can provide one, more or all of local and remote cable insertion detection, cable length indication, remote node power-on detection, remote power, a serial number and a management interface.

Figure 32:
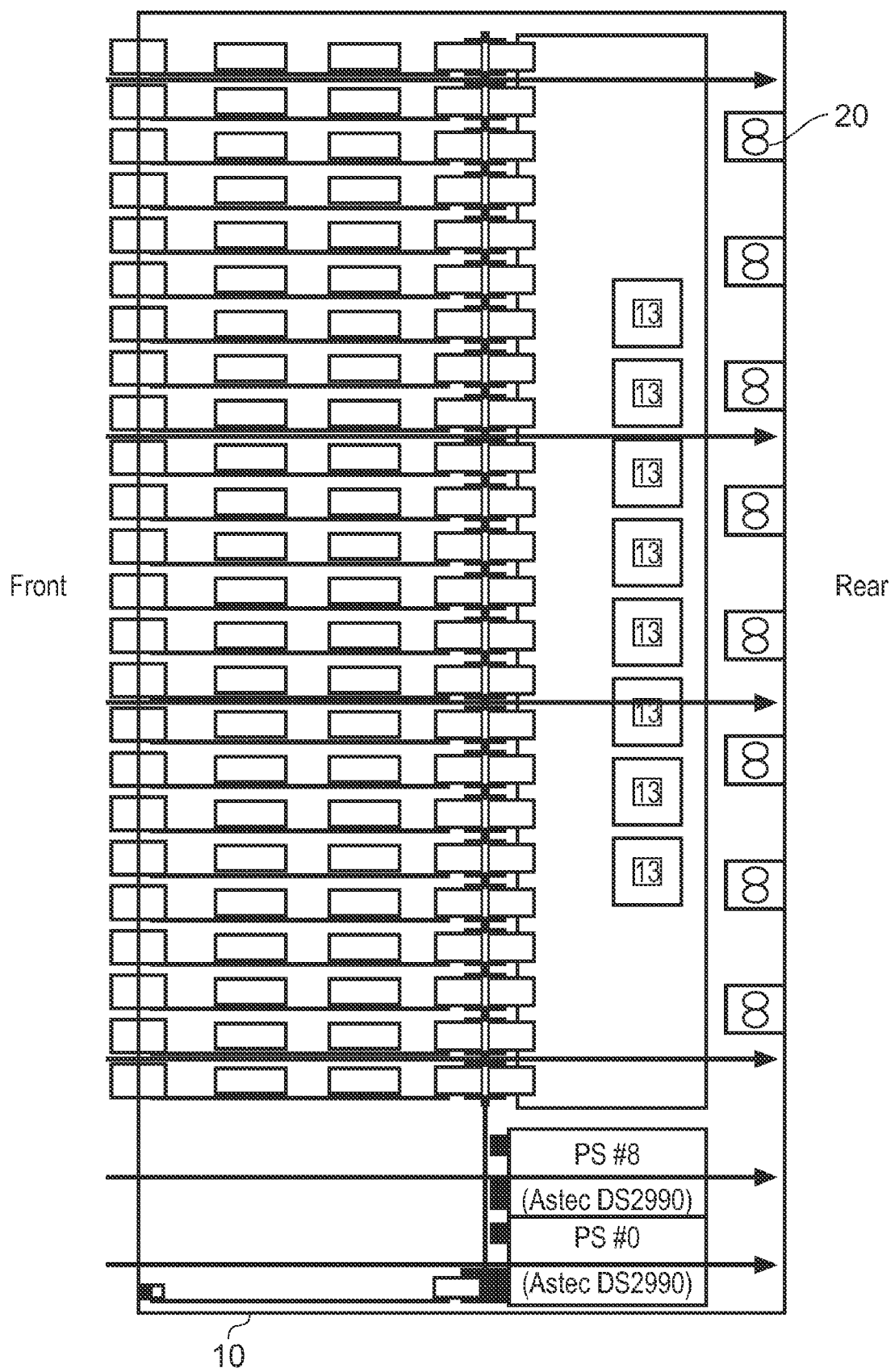
FIG. 32 is a schematic representation of airflow though a switch chassis.

FIG. 32 is a schematic representation of the airflow through an example switch chassis. As illustrated by the arrows, the airflow is from the front to the rear, being drawn through by fans 20 in the fabric cards 12 and the power supplies 18.

The air inlet is via perforations at the line card 14 front panel. Fans 20 at the fabric cards 12 pull air across the line cards, though the openings 34 in the vertical midplane 30 and across the fabric cards 12.

Line card cooling is naturally redundant since the fabric cards are orientate orthogonally to the line cards. In other words, cooling air over each line card is as a result of the contribution of the effect of the fans of the fabric cards along the line card due to the respective orthogonal alignment. In the case that a fabric card fails or is removed, a portion of the cooling capacity is lost. However, as the cooling is naturally redundant the line cards will continue to operated and be cooled by the remaining fabric cards. Each fan is internally redundant and the fans on the fabric cards 12 can be individually hot swappable without removing the fabric card 12 itself. The fabric card 12 and line card 14 slots can be provided with blockers to inhibit reverse airflow when a card is removed. Empty line card 14 and fabric card 12 slots can be loaded with filler panels that prevent air bypass.

Each power supply has an internal fan that provides cooling for each power supply. Fans at the power supplies pull air through chassis perforations at the rear, across the chassis management cards 18, and through the power supply units 16. Chassis management card cooling is naturally redundant as multiple power supply units cool a single the chassis management card.

It will be appreciated that changes and modifications to the above described examples are possible. For example, although in the present example cooling if provided by drawing air from the front to the rear, in another example cooling could be from the rear to the front.

Also, although in the above described examples the fabric cards and the switch cards are described as being orthogonal to each other, they do not need to be exactly orthogonal to each other. Indeed, in an alternative example they could be angled with respect to each other but need not be exactly orthogonal to each other.

Also, in the above described examples the midplane connector pairs 32 are configured as first and second connectors 62 and 64, in another example they could be configured as a single connector that is assembled in the midplane. For example, through connectors could be provided that extend through the midplane vias. The through connectors could be manufactured to be integral with a first connector frame (e.g., a U-shaped frame or a box-shaped frame as in FIGS. 19 and 23, respectively) and the contacts inserted through the vias from a first side f the midplane 30. Then a second connector frame could be inserted over the connectors on the second side of the midplane 30 in a mutually orthogonal orientation to the first connector frame.

An example cable-based switch chassis can provide a very large single switch chassis having, for example, one or more of the following advantages, namely a 3456 ports non-blocking Clos (or Fat Tree) fabric, a 110 Terabit/sec bandwidth, major improvements in reliability, a 6:1 reduction in interconnect cables versus leaf and core switches, a new connector with superior mechanical design, major improvement in manageability, a single centralized switch with known topology that provides a 300:1 reduction in entities that need to be managed.

In such a cable-based interconnect system, the identification of local and remote cable connectivity is important for configuration and diagnosis of the cable-based interconnect system. This can include the determination of whether a cable is connected locally, whether it is connected at the remote end or ends (remote end for a single cable or remote ends for a split- or multi-link cable) and where the remote end(s) is (are) connected.

In an example embodiment of the invention, in order to avoid the need for any active and intelligent entity on the remote side of a cable, access can be provided to information storage on the remote side via a low-power side-band channel associated with the cable. In one example, in which a sideband channel implements an I2C type link, dedicated I2C based storage devices can be implemented with each cable connector, and then these devices can be accessed from the remote end of the cable. The I2C based storage devices are arranged to contain relevant serial number (etc.) information can allow unique identification of the end-point. Such an example can provide an asymmetric scheme, whereby one side represents an active, intelligent entity whereas the other side represents only the (un-intelligent) storage device. In operation of this example, the "un-intelligent" side of the connection is set in a power state that allows access to the I2C devices. Hence, if no power is available at the un-intelligent end of the cable, no information is available.

In another example, in order to overcome the remote power-issue, power for the I2C device can be supplied over the cable from the active side. In this case, the I2C device is implemented in a way that allows it to record more state about the local side. For example, a local power mode (e.g., "off", "aux" and "full") can be provided. This information can be determined using a PLD with status input reflecting the corresponding dynamic state in addition to the static (e.g., fabric defined) serial number info.

In one example, to provide for both sides to be active, dual-master support can be provided on the I2C link. In addition, each side can have control logic that in the default (power-off) mode operate as above, but in addition indicates whether "active" is supported.

In such an example, either side can be active, and each side can determine if the remote end of the cable is connected, determine the ID of the other end, and also determine the state of the other end (including if the other end is in a mode where link training can be expected). Also, if "active" is indicated and the remote side is in at least an "aux" state, then more elaborate duplex communication can take place via the I2C link (e.g., using IPMI type messaging protocols).

In such an example where either side can be active (an active-active scheme), both sides can detect if the other end supplies power, and determine to what extent the local logic is powered locally or from remote.

In a situation where a remote-power supply is detected but repeated attempts to read the remote state information fails, this should be considered a special case of failure that indicates broken interface logic at the remote end.

Supplying power to a remote board that also has its own internal power supply system can increase the complexity of the board design, and can also increase cost. In view of this, in an example embodiment, powering of storage devices in a remote board is not supported and only support powering of a remote cable connector is supported. If in this example writeable "FRU info" storage is provided in a cable connector, it is possible dynamically to record information about an attached chassis in the cable connector and to have this be persistent and accessible to the remote side even if the local side is no longer operational. In other words, in this example, the cable connector can contain information about time and identity of last connectivity to an operational chassis. In this way, it is possible to verify connectivity where not all involved chassis instances are powered up and operational.

Figure 33:
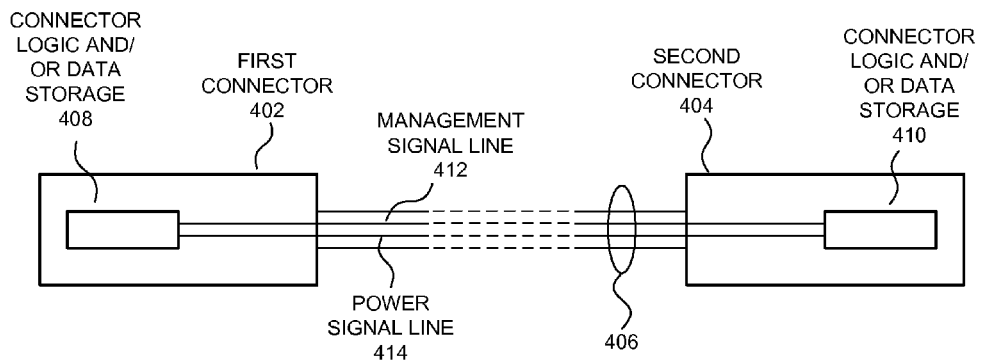
FIGS. 33, 34, and 35 illustrate example cable connector and chassis connector configurations.

FIG. 33 is a schematic representation of a cable 406 comprising a first connector 402 at a first end point thereof and a second connector 404 at a second end point thereof. In addition to data signal conductors (not shown) the cable 406 includes a management signal line (e.g., an I2C line) 412 and a power signal line 414. The management signal line 412 and a power signal line 414 extend between connector logic and/ or data storage 408 in the first connector 402 and connector logic and/or data storage 410 in the second connector 404. The connector logic can provide a logical interface to a chassis component connector when the cable connector is connected thereto, and the data storage can provide the FRU info storage mentioned above.

Figure 34:
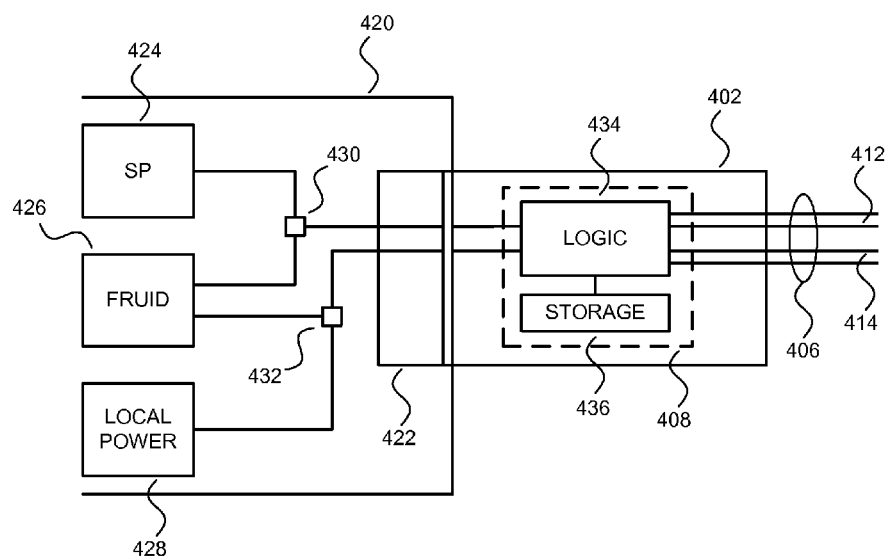

FIG. 34 illustrates an example of the connector 402 of the cable 406 connected to a chassis component connector 422 of a field replaceable chassis component 420 (e.g., a line card). As shown in FIG. 34, the connector logic and/or data storage 408 in the first connector 402 comprises connector logic 434 and storage logic 436. In the example shown in FIG. 38, the management signal line 412 and the power signal line 414 connect to the connector logic 434, and this provides an interface to the data storage 436. In other examples other configurations are possible.

In the chassis component 420, a service processor 424 and field replaceable identifier (FRUID) storage 426 are selectively connected to the management signal line connection of the connector logic 434 via a switch 430 (e.g., a MOSFET) whereby the service processor 424 and the logic 434 have selective access to the FRUID information. As described above, in order to address situations where the chassis component may or may not be powered, from the local power source 428, the FRUID can receive power either from the local power source when this is active, or from the power line 414 of the cable 406 through a switch (e.g., a MOSFET) 432. in this way, both remote power supply and I2C access can be achieved via a cable and connector with power and access for dedicated devices on a (remote) FRU being achieved without mixing power domains. The switches (e.g., the MOSFETS) 430 and 432 can be used to control whether the local or the remote power domain is active. If powered from remote, then the I2C link can also be electrically isolated from the rest of the local FRU. The internal connector logic 434 can be used to control if power is supplied to the FRU from the cable.

Figure 35:
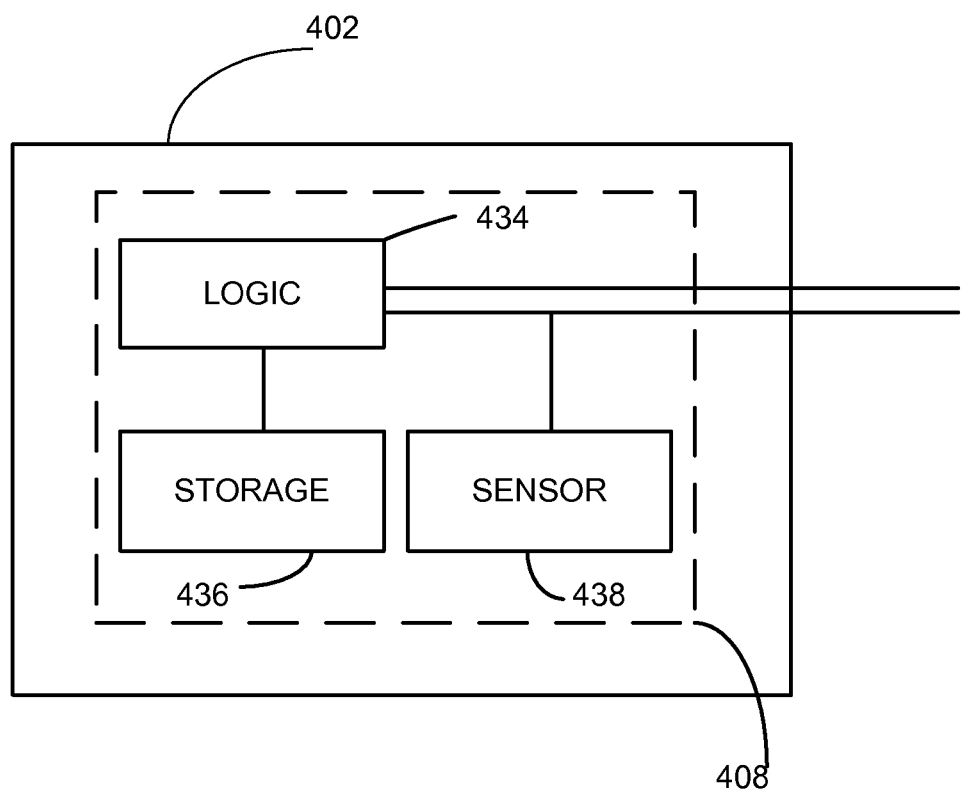
Figure 36:
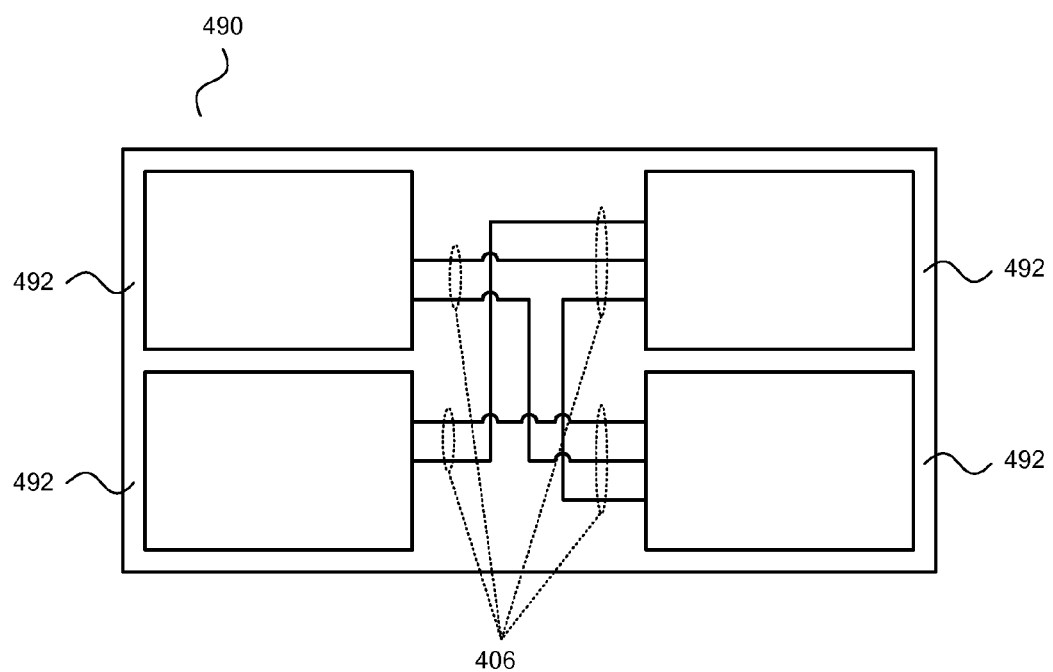
FIG. 36 illustrates a computer system with system components.

In another example embodiment, remote I2C type sideband communication is not supported, but instead all information is exchanged either in-band, or via an (out-of-band) management network infrastructure. Also in this example it is desirable to be able to detect if the remote cable connector is plugged into a chassis connector, and to detect the power state of the remote chassis. This can provide state information where both end-point have not yet been identified, and allow both sides to detect transient or permanent state changes. This functionality does not need to depend on remote I2C type access to sensor devices, but instead it can be implemented by a "loopback signal" where the electrical behavior (as observed from the local side) is a function of whether the remote cable connector is plugged in, the local power mode, and also the power mode of the remote chassis. By having this information monitored, for example by a hardware level sensor mechanisms that records the state of the signal continuously, transient state changes can be recorded without depending on any real-time poll frequency which a pure remote I2C sensor based scheme would require. FIG. 35 illustrates an example of the connector 402 that includes a sensor 438. Sensor 438 monitors the loopback signal.

In another example embodiment, remote I2C type sideband communication is not supported, but instead all information is exchanged either in-band, or via an (out-of-band) management network infrastructure. Also in this example it is desirable to be able to detect if the remote cable connector is plugged into a chassis connector, and to detect the power state of the remote chassis. This can provide state information where both end-point have not yet been identified, and allow both sides to detect transient or permanent state changes. This functionality does not need to depend on remote I2C type access to sensor devices, but instead it can be implemented by a "loopback signal" where the electrical behavior (as observed from the local side) is a function of whether the remote cable connector is plugged in, the local power mode, and also the power mode of the remote chassis. By having this information monitored, for example by a hardware level sensor mechanisms that records the state of the signal continuously, transient state changes can be recorded without depending on any real-time poll frequency which a pure remote I2C sensor based scheme would require.

An example embodiment of the invention can provide the ability to observe all major aspects of the connectivity associated with an interconnect cable from the end-points to which either end of the cable is attached without any dependency on whether the remote end is connected or not, and irrespective of the state of the remote end-point.

An example embodiment can provide for the identification of local and remote cable connectivity, whereby the complexity associated with side-band based information can be traded against the use of out-of-band mechanisms in ways that still allows all relevant information to be handled.

An example embodiment can combine cable connector based active logic and (low-power) power supply via the cable with chassis side logic in order to allow observation of remote end-point ID and state without depending on any minimal operational/power state for the remote end-point.

Dynamic single and dual master cable side-band can be combined with local or remote low-power support in order to provide remote cable end-point ID and state independently of the operational state of the remote system.

Both remote power supply and I2C access can be achieved via a cable and connector. Power and access for dedicated devices on a (remote) FRU can be achieved without mixing power domains, but with reduced ability of access from the FRU (local) side.

MOSFET switches can be used to control whether a local or a remote power domain is active. If powered from remote, then an I2C link can also be electrically isolated from the rest of the (local) FRU. The connector may have internal logic also to control if power is supplied to the FRU.

With reference to FIGS. 33 and 34, it should be noted that the connectors and the connections are shown schematically, and may comprises any appropriate number and configuration of electrical and/or optical contact elements and connections as required for a particular implementation.

Accordingly, in an embodiment of the invention, in order to monitor connectivity status associated with an interconnect cable from the end-points to which either end of the cable is attached, a storage device storing a field replaceable unit identifier can be provided to uniquely identify a cable end-point, which identifier can then be accessed to determine the connectivity status.

Although the embodiments above have been described in considerable detail, numerous variations and modifications will become apparent to those skilled in the art once the above disclosure is fully appreciated.

What is claimed is:

1. A cable connector for attaching a cable, the cable connector comprising a storage device that stores a serial number for a cable end-point that uniquely identifies the cable end-point, wherein the cable connector comprises a power connection for supplying power from a local end of the cable to a remote end of the cable to power a storage device in a connector at the remote end.

2. The cable connector of claim 1, wherein the storage device is configured to be accessible using an inter-integrated circuit (I2C) protocol.

3. A cable comprising a connector at a first end-point thereof that includes a storage device that stores a serial number for the first end-point that uniquely identifies the first end-point, wherein the cable comprises a power connection for supplying power from a local end of the cable to a remote end of the cable to power a storage device in a connector at the remote end.

4. The cable of claim 3, comprising a connector at a second end-point thereof that includes a storage device that stores a serial number for the second end-point that uniquely identifies the second end-point.

5. The cable of claim 3, comprising a connector that includes at least one sensor device to detect one or more of chassis connectivity, chassis power state and chassis operational state.

6. The cable of claim 5, wherein the at least one sensor is configured to be accessible using an inter-integrated circuit (I2C) protocol.

7. The cable of claim 6, wherein the at least one sensor is accessible from at least one of a local end and a remote end of the cable using an I2C protocol.

8. The cable of claim 7, comprising at least one I2C register for at least one of local sensor information and remote sensor information.

9. The cable of claim 7, wherein sensor information is provided using one or more dedicated loopback signals within at least one of the cable and a connector of the cable.

10. The cable of claim 3, wherein the storage device is configured to be accessible using an inter-integrated circuit (I2C) protocol.

11. The cable of claim 10, wherein the storage device is accessible from at least one of a local end and a remote end of the cable using an I2C protocol.

12. The cable of claim 3, comprising a serial inter-integrated circuit (I2C) connection.

13. The cable of claim 12, wherein dual-master support is provided on the I2C link.

14. The cable of claim 3, wherein information about a component connected to the connector of the cable is recorded dynamically in the storage device in the connector.

15. The cable of claim 3, wherein information is exchanged by one or more of in-band, side band or an out-of-band management network infrastructure.

16. A computer system comprising a plurality of system components, having component connectors and at least one cable interconnecting system components, wherein the cable is provided with at least first and second connectors, and a storage device in at least one of the at least first and second connectors that stores a serial number for a corresponding end-point of the cable that uniquely identifies the corresponding end-point of the cable, and wherein the cable comprises a power connection for supplying power from a local end-point of the cable to a remote end-point of the cable to power a storage device in the connector at a remote end-point.

17. The computer system of claim 16 wherein the at least one said storage device is provided in one of said first and second connectors.

18. The computer system of claim 16, wherein at least one said storage device is provided in a system component.

19. A method of monitoring connectivity status associated with an interconnect cable from end-points to which either end of the cable is attached, the method comprising:
  providing a storage device in a local end of the cable, wherein the storage device stores a field replaceable unit identifier for uniquely identifying a cable end-point, wherein a storage device of a remote end-point of the cable is configured to be powered by a local end-point of the cable; and
  accessing the identifier to determine the connectivity status.

* * * * *